US012566323B2

(12) United States Patent
Patra et al.

(10) Patent No.: US 12,566,323 B2
(45) Date of Patent: Mar. 3, 2026

(54) AI ENABLED SELECTIVE RAMAN SPECTROMETRY USING MICROSCOPY FOR DIAGNOSIS AND ANALYSIS OF BIOLOGICAL SAMPLES

(71) Applicant: Secretary, Department of Biotechnology, New Delhi (IN)

(72) Inventors: Ashutosh Patra, Koraput (IN); Praveen Kumar, Madhepura (IN); Tushar Sehgal, New Delhi (IN)

(73) Assignee: Secretary, Department of Biotechnology, New Delhi (IN)

( * ) Notice: Subject to any disclaimer, the term of this patent is extended or adjusted under 35 U.S.C. 154(b) by 234 days.

(21) Appl. No.: 18/014,697

(22) PCT Filed: Jul. 7, 2021

(86) PCT No.: PCT/IB2021/056088
§ 371 (c)(1),
(2) Date: Jan. 5, 2023

(87) PCT Pub. No.: WO2022/009112
PCT Pub. Date: Jan. 13, 2022

(65) Prior Publication Data
US 2023/0258918 A1     Aug. 17, 2023

(30) Foreign Application Priority Data
Jul. 7, 2020     (IN) .............................. 202011028851

(51) Int. Cl.
G01J 3/44          (2006.01)
G01N 21/65          (2006.01)
(Continued)

(52) U.S. Cl.
CPC ........... G02B 21/125 (2013.01); G01N 21/65 (2013.01); G02B 21/0032 (2013.01);
(Continued)

(58) Field of Classification Search
CPC ........ G02B 21/12; G02B 21/00; G02B 21/24; G02B 21/26; G02B 21/365; G01N 21/65;
(Continued)

(56) References Cited

U.S. PATENT DOCUMENTS 9,012,872 B1 *   4/2015   Fang ................... G01N 21/6428
                                                                  250/461.2
2002/0176160 A1 *  11/2002   Suzuki ................. G02B 21/361
                                                                  359/380

(Continued)

FOREIGN PATENT DOCUMENTS

DE          102018219867 B4       5/2020

OTHER PUBLICATIONS

Patra, A., et al., PCT/IB2021/056088, International Search Report, Dec. 27, 2021, 3 pages.

(Continued)

*Primary Examiner* — Abdullahi Nur
(74) *Attorney, Agent, or Firm* — Rahman LLC

(57) ABSTRACT

The invention relates to the domain of microscope based imaging. The invention provides methods and apparatuses for providing improved microscope based digital imaging solutions that are capable of providing high quality images with a high level of image detail. The invention additionally provides solutions for artificial intelligence based controlling of a digital microscope's imaging functions to enable bright field/dark field imaging functionality to be combined with spectroscopic functions to obtain higher detail and more meaningful information about a specimen sample.

9 Claims, 12 Drawing Sheets

(51) Int. Cl.

| | |
|---|---|
| *G02B 21/00* | (2006.01) |
| *G02B 21/12* | (2006.01) |
| *G02B 21/24* | (2006.01) |
| *G02B 21/26* | (2006.01) |
| *G06V 10/143* | (2022.01) |
| *G06V 10/147* | (2022.01) |
| *G06V 10/25* | (2022.01) |
| *G06V 10/82* | (2022.01) |
| *G06V 20/69* | (2022.01) |
| *G02B 27/10* | (2006.01) |
| *G02B 27/14* | (2006.01) |

(52) U.S. Cl.
CPC ......... *G02B 21/008* (2013.01); *G02B 21/241* (2013.01); *G02B 21/248* (2013.01); *G02B 21/26* (2013.01); *G06V 10/143* (2022.01); *G06V 10/147* (2022.01); *G06V 10/25* (2022.01); *G06V 10/82* (2022.01); *G06V 20/693* (2022.01); *G01N 2201/062* (2013.01); *G01N 2201/0635* (2013.01); *G01N 2201/0636* (2013.01); *G02B 27/1013* (2013.01); *G02B 27/141* (2013.01)

(58) Field of Classification Search
CPC ......... G01J 3/44; G06V 10/143; G06V 10/25; G06V 10/82; G06V 20/69

See application file for complete search history.

(56) References Cited

U.S. PATENT DOCUMENTS

| | | | | |
|---|---|---|---|---|
| 2004/0125373 | A1* | 7/2004 | Oldenbourg ....... | G02B 21/0004 |
| | | | | 356/364 |
| 2007/0272842 | A1* | 11/2007 | Knebel ............. | G02B 21/0084 |
| | | | | 250/234 |
| 2009/0021724 | A1* | 1/2009 | Mahadevan-Jansen ..................... | |
| | | | | G01N 21/65 |
| | | | | 356/73 |
| 2011/0007386 | A1* | 1/2011 | Lupton ................ | G02B 21/086 |
| | | | | 359/385 |
| 2011/0157350 | A1* | 6/2011 | Yamamoto ............. | G02B 21/14 |
| | | | | 382/106 |
| 2012/0126142 | A1* | 5/2012 | Matsui ............... | G01N 21/6452 |
| | | | | 250/459.1 |
| 2013/0265407 | A1 | 10/2013 | Nieden | |
| 2014/0152800 | A1 | 6/2014 | Fomitchov et al. | |
| 2015/0276480 | A1* | 10/2015 | Ghosh ................ | G02B 21/0064 |
| | | | | 356/301 |
| 2016/0327779 | A1* | 11/2016 | Hillman ............. | G02B 21/0032 |
| 2021/0043331 | A1* | 2/2021 | Ozcan ................... | G16H 30/40 |

OTHER PUBLICATIONS

Patra, A., et al., PCT/IB2021/056088, Written Opinion, Dec. 27, 2021, 6 pages.

Laroche, J., et al., "Developing an Automated Microscope Integrated with Deep Learning Postprocessing to Conduct Preliminary Cancer Diagnosis," Major Qualifying Project Report submitted to Worcester Polytechnic Institute, Apr. 26, 2018, 56 pages.

Chen, P., et al., "Microscope 2.0: An Augmented Reality Microscope with Real-time Artificial Intelligence Integration," Nature Medicine, arXiv: 1812.00825, Nov. 21, 2018, 28 pages.

* cited by examiner

900

AI ENABLED SELECTIVE RAMAN SPECTROMETRY USING MICROSCOPY FOR DIAGNOSIS AND ANALYSIS OF BIOLOGICAL SAMPLES

FIELD OF THE INVENTION

The invention relates to the domain of microscope based imaging. More particularly, the invention provides methods and apparatuses for providing improved microscope based digital imaging solutions that are capable of providing high quality images with a high level of image detail. The invention additionally provides solutions for artificial intelligence based controlling of a digital microscope's imaging functions to enable bright field/dark field imaging functionality to be combined with spectroscopic functions to obtain higher detail and more meaningful information about a specimen sample.

BACKGROUND

Digital microscopy relies on images formed on an image sensor (for example a CMOS or CCD sensor) based on light that is scattered off a specimen sample on a slide, and that is directed onto the image sensor through an optical assembly comprises a plurality of optical lenses interposed between the specimen sample and the image sensor.

The optical assembly typically includes at least two lenses—wherein varying the distance between the two lenses produces magnification that can range from low end to high end in an analog manner. An objective lens which is nearer to the sample plane, and an imaging lens that is nearer to the image sensor are moved relative to each other by a control unit—in order to enable selective change in magnification of images formed on the image sensor.

Use of conventional microscopy for analysis of samples relies on operators (such as a pathologist) painstakingly looking at the sample under magnification for determining state information concerning the sample. This is time consuming and is also prone to human error.

Yet further, it is axiomatic as the level of magnification of a sample increases, more state information can be extracted from the sample. However higher magnification also vastly increases the overall size of the resulting image, which creates image processing concerns—and additionally, further increases the burden on image analysis on the operator.

Another problem that is commonly encountered in conventional microscopy is that digital microscopes operate using a conventional color image sensor. A color image sensor comprises a grid of photosensors—wherein each photosensor is capable of detecting illumination or luminance or illuminating wavelengths across the visible spectrum. The grid of photosensors additionally has a color filter array (i.e. an array of Red (R), Green (G), Blue (B) color filters arranged on top), such that each of the color filters, permits only a corresponding set of color wavelengths to pass through and onto the corresponding photosensor.

The color filter array forms a mosaic of tiny color filters placed over the pixel photosensors that for the image sensor to capture color information.

Color filters are needed because the typical photosensors detect light intensity with little or no wavelength specificity, and therefore cannot separate color information. The color filters filter the light by wavelength range, such that the separate filtered intensities include information about the color of light. The raw image data captured by the image sensor is then converted to a full-color image (with intensities of all three primary colors represented at each pixel) by a demosaicing algorithm which is tailored for each type of color filter.

It has however been found that for the reasons provided below, use of color filter arrays overlaid on the image sensor causes a loss of image detail that is particularly significant in microscope related imaging applications.

This is because, without the use of colour filter arrays on an image sensor, when a photon arrives at a mono chip, one of two things happens. The photon either hits a pixel well within the image sensor and is recorded, or it hits a gap between the pixel wells (or gets lost for any other reason) and is therefore not sensed. However, when an image sensor has a color filter array disposed thereon, there is a third case—wherein a photon can hit a filter in the colour filter array, and be discarded because it doesn't match the colour for the filter. This means that in a typical RGB color filter array there is a 25% loss of photons having green luminance characteristics, and there is a 50% loss of photons having red or blue luminance characteristics. This loss over the surface area of the image creates a situation where image detail and image signal are lost—and such losses are unacceptable in microscopy applications.

While the loss in detail can be somewhat offset by increasing the resolution (number of megapixels) of the image sensor, the increase in resolution has a host of associated problems, including a much larger data size for the resulting images—which increases the time overhead and computing overhead for image processing, image analysis and image transmission. Additionally as the image sensor resolution increases, the optical magnification that can be used with the image sensor within a microscope has been found to decrease. So while a 2 megapixel image sensor can readily be used with a 100× optical magnification assembly, a 6 megapixel image sensor can effectively be used only with a 20× optical magnification.

Additionally, it has been found that while brightfield microscopy is suitable for obtaining certain types of image information, in certain cases significantly higher level of image detail is desirable, and that such detail can be acquired through spectroscopic imaging/analysis. Current digital microscopy solutions do not however enable combining of brightfield microscopy technology with spectroscopic analysis, especially raman spectroscopy technology to selective apply spectroscopic analysis within a digital microscope There is accordingly a need for solutions that address all of the above problems and needs.

BRIEF DESCRIPTION OF THE ACCOMPANYING DRAWINGS

FIG. 1 illustrates a digital microscope assembly configured in accordance with the teachings of the present invention.

FIGS. 2 and 3 respectively illustrate methods of slide sample analysis in accordance with the teachings of the present invention.

Figure 9:
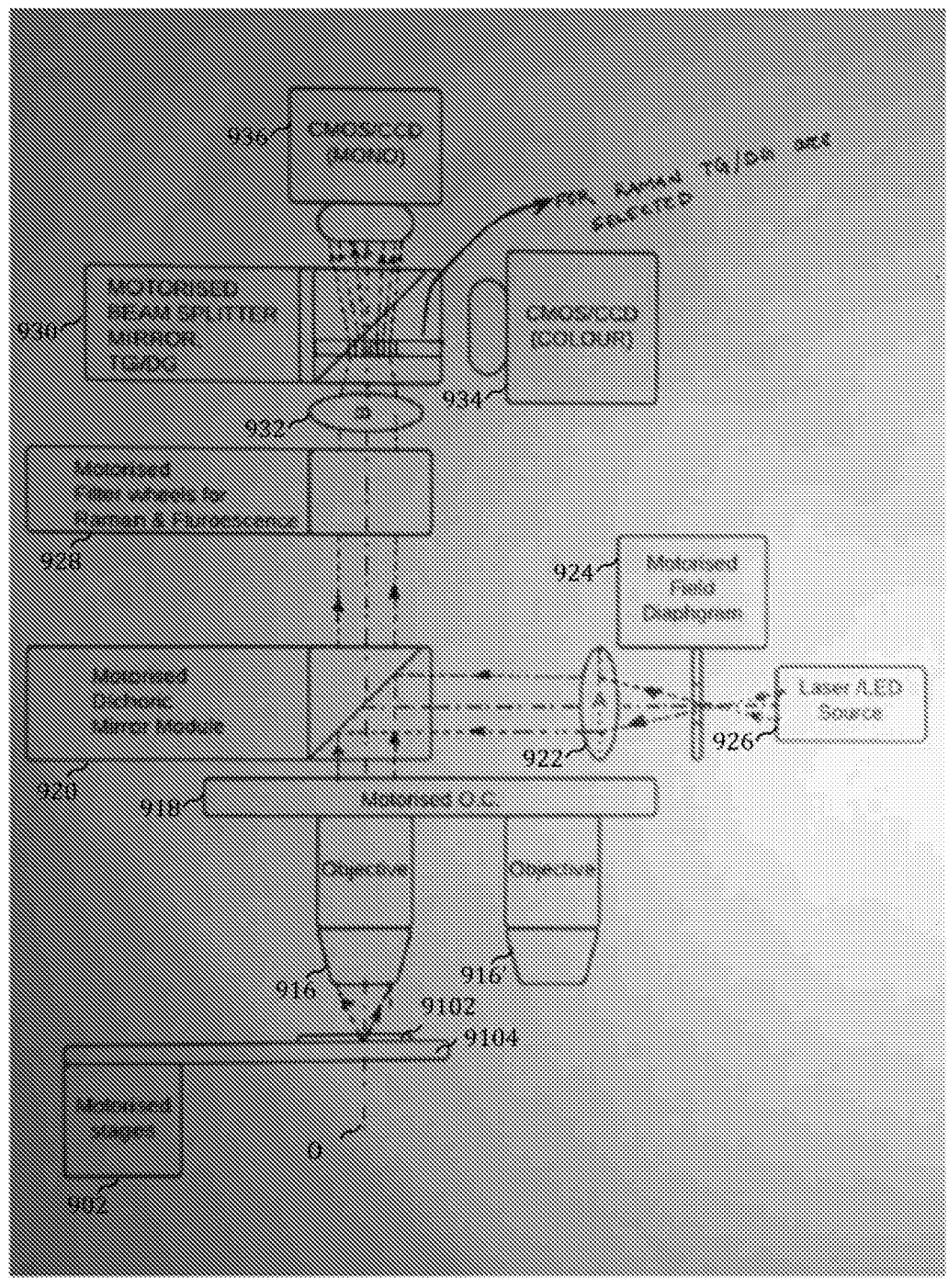

FIG. 9 illustrates a fourth embodiment of a digital microscope assembly of a kind that has been more generally described in connection with FIG. 1 and that is used for state information determination based on raman spectroscopy.

Figure 10:
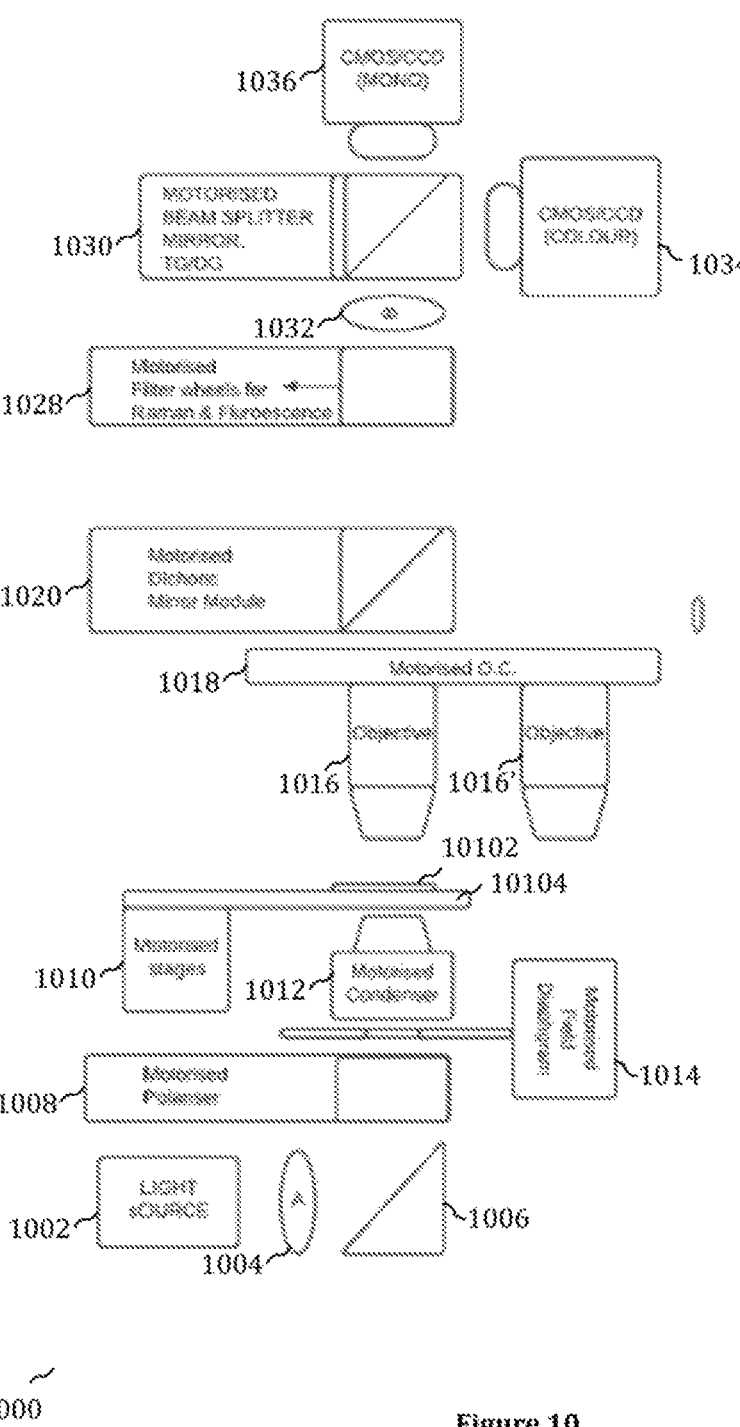

FIG. 10 illustrates a fifth embodiment of a digital microscope assembly of a kind that has been more generally described in connection with FIG. 1 and that is used for state information determination based on polarized light.

Figure 1:
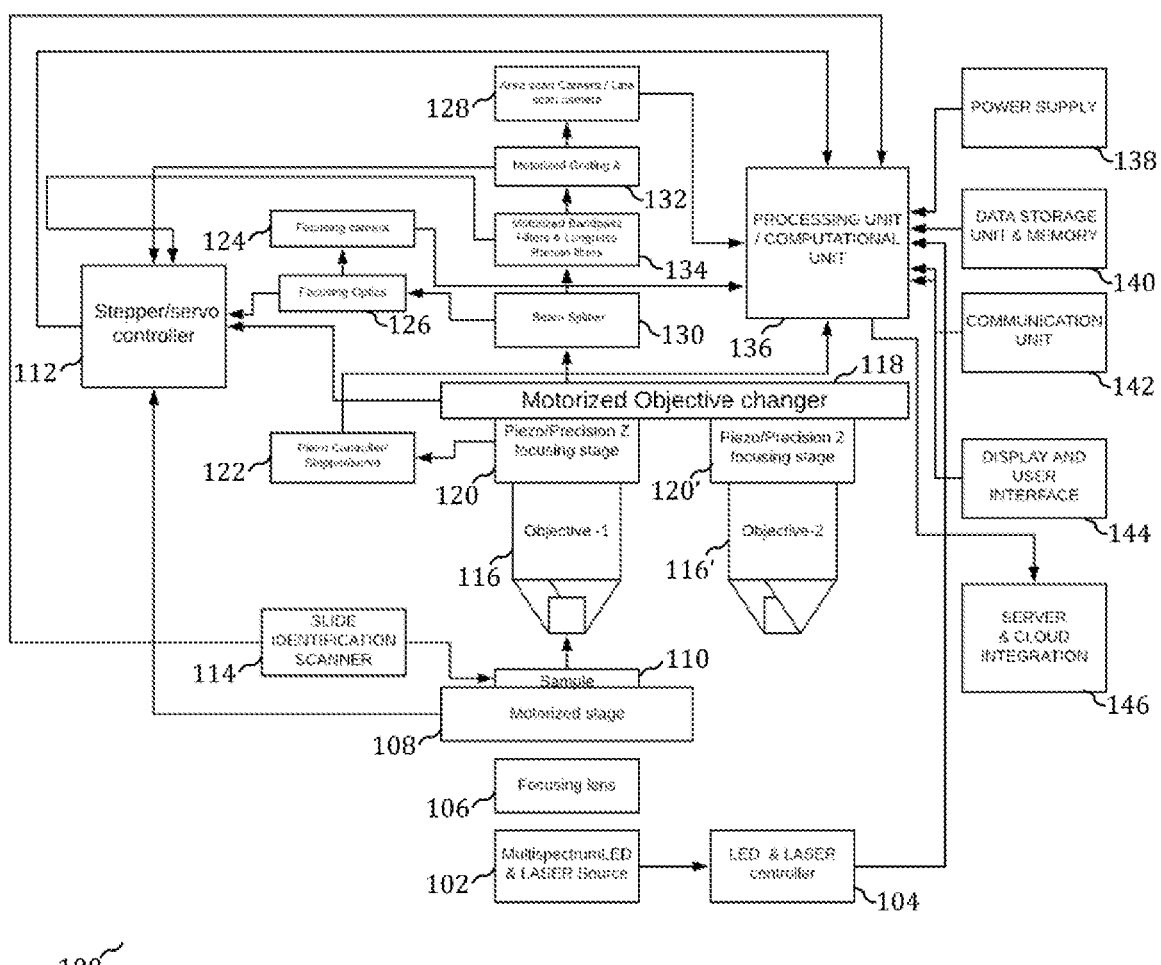
Figure 2:
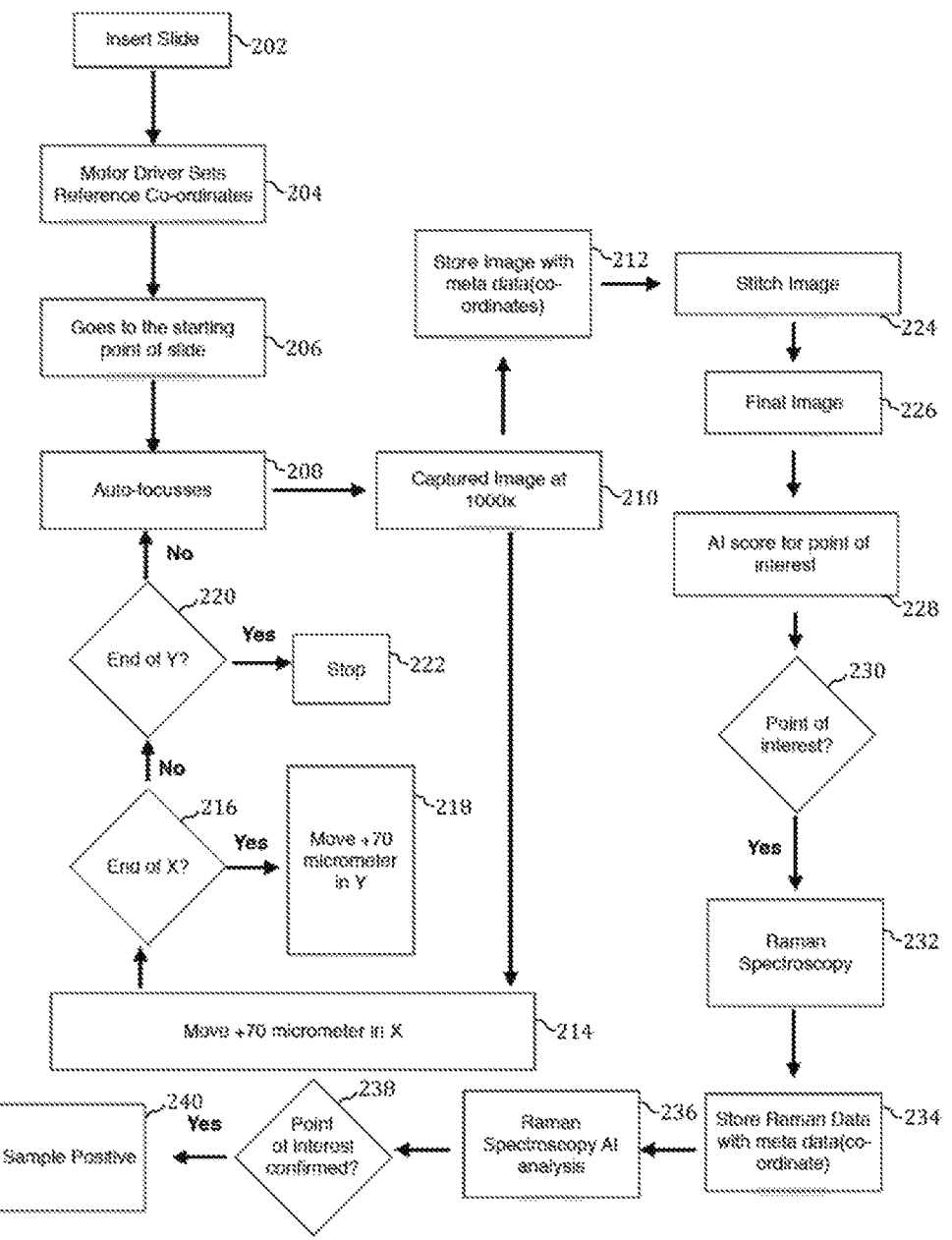
Figure 11:
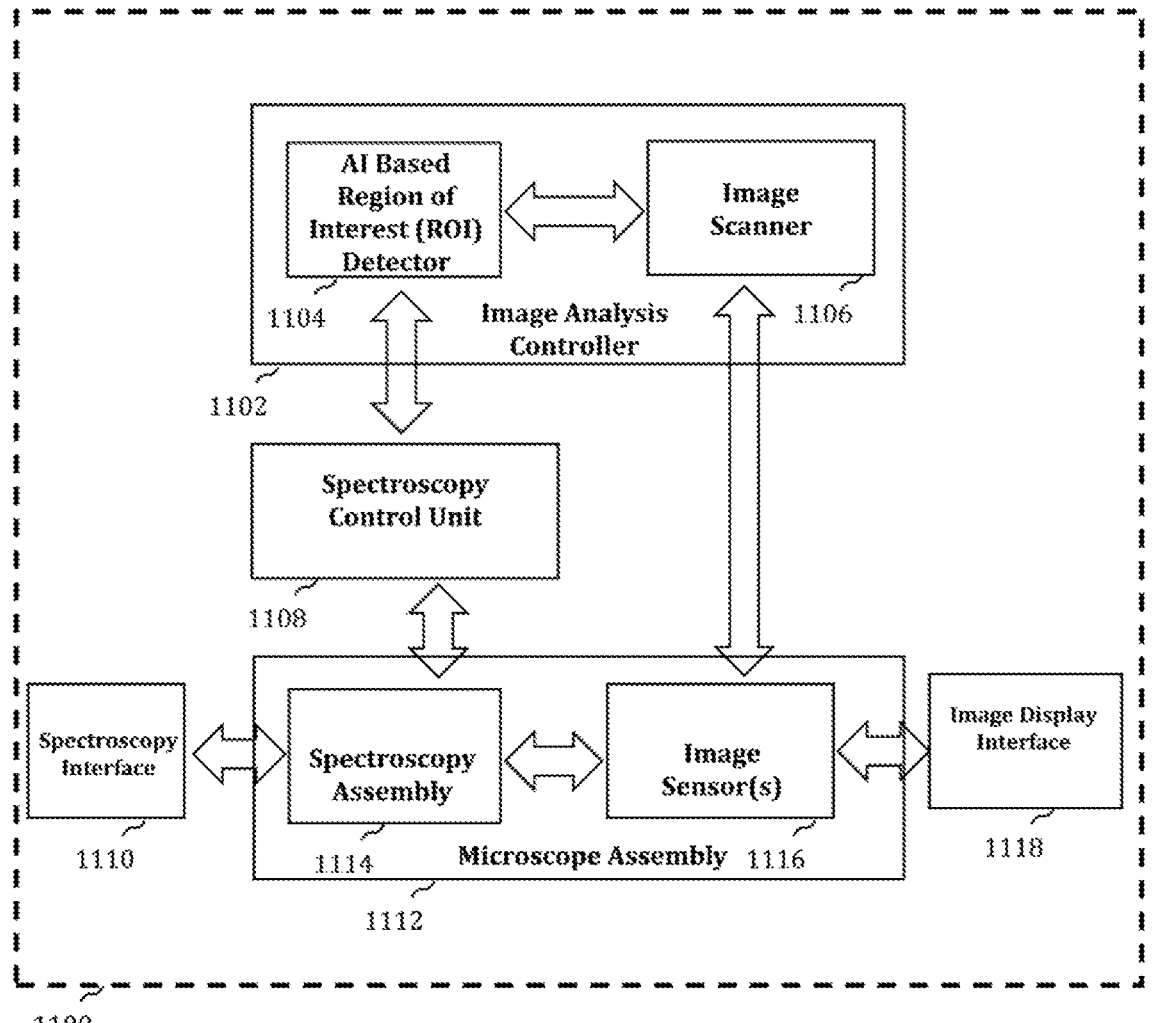

FIG. 11 illustrates a system configured to implement the methods of FIGS. 1 and 2.

Figure 12:
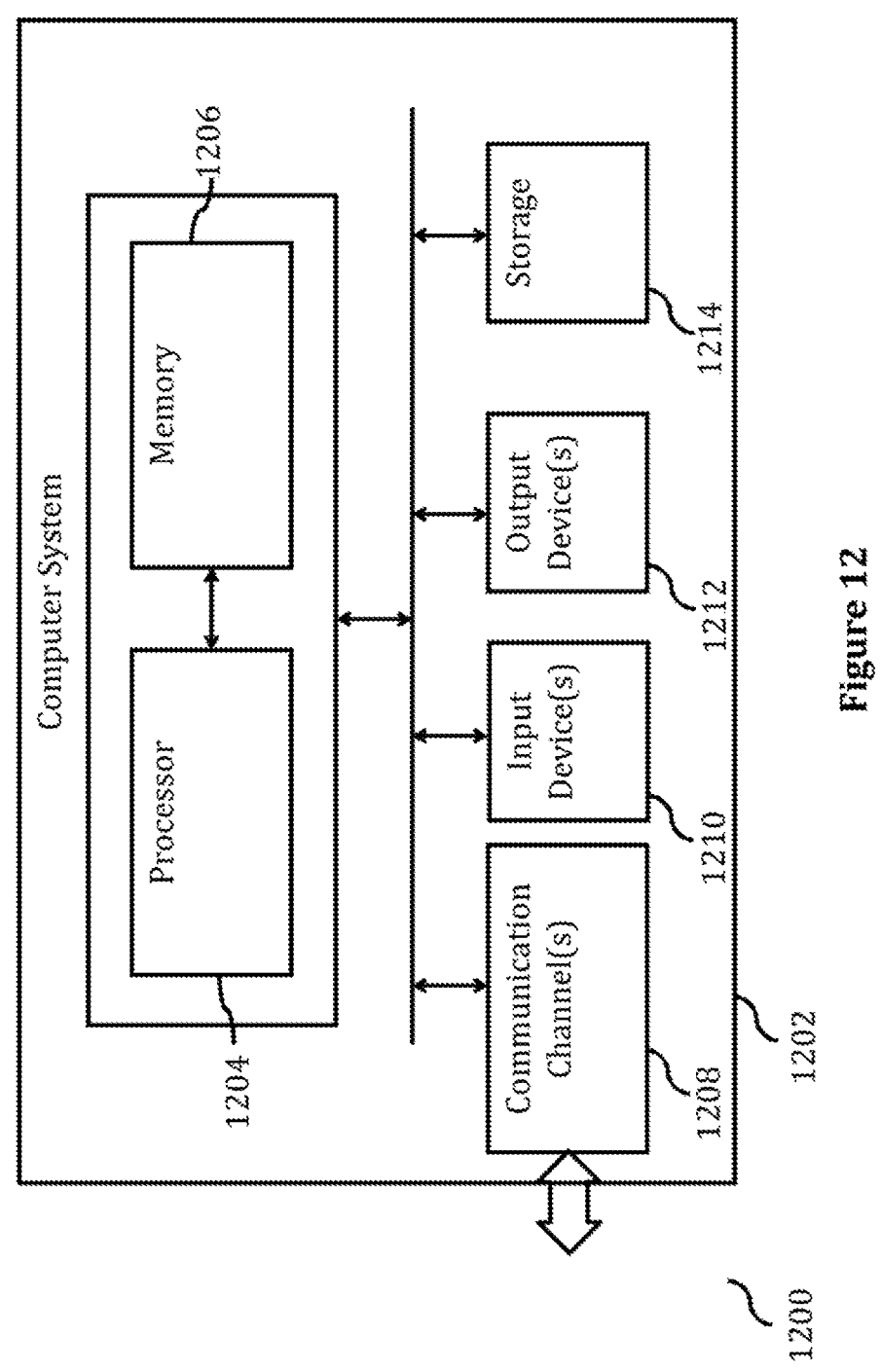

FIG. 12 illustrates an exemplary computer system according to which various embodiments of the present invention may be implemented.

SUMMARY

The invention provides methods, systems and apparatuses for providing improved microscope based digital imaging solutions that are capable of providing high quality images with a high level of image detail.

The invention additionally provides solutions for artificial intelligence based controlling of a digital microscope's imaging functions to enable bright field imaging functionality to be combined with spectroscopic functions to obtain higher detail and more meaningful information about a specimen sample. In an embodiment, bright field microscopy is used to scan and select a site or region of interest at which the Raman spectroscopy has to be implemented. An artificial intelligence/machine learning algorithm is used to scan the brightfield microscopy images and to identify regions of interest/target parameters in the image(s) of the specimen sample. These regions of interest/target parameters are thereafter subjected to scanning using Raman spectroscopy for chemical composition detection—and the scanned chemical compositions can be compared against the precalibrated data for an accurate diagnosis or prognosis of the specimen sample or of a disease state.

DETAILED DESCRIPTION

The present invention comprises a digital microscope based system which can capture images at very fine resolution. The digital microscope of the present invention:

can combine bright field/dark field technologies into a single device.

uses at least three discrete monochrome filters (and one under clear filter or without any filters for reference image) (red, green and blue and clear) independent of each other, to obtain discrete images under each of these monochrome filters, and combines the images obtained under each of the three monochrome filters (keeping the clear filter image as reference for the other three images to combine) to obtain high quality images.

enables a reduction in the size of the resulting digital images.

is connected to the internet and to a cloud storage from where the data can be sent to decentralised processing.

combines brightfield microscopy with raman spectroscopy to improve extraction and identification of sample states.

applies artificial intelligence to both brightfield microscopy and raman spectroscopy to reduce time and effort, and to improve the accuracy, for sample state determination.

The invention achieves this by providing:

a combination of lenses with one or more of respectively different powers, focal lengths and aperture, diameter, and specific optical coatings to minimise aberrations and noise, arranged in a predefined configuration one or more than one CMOS/CCD camera for capturing light waves obtained through the configured lenses.

at least three monochrome filter (and one clear filter) (red blue and green filters) each of which are used individually and without the others to produce three-single channel/single color/monochrome images (and are digitally processes to produce one image keeping the clear filter image as reference)

a novel process to combine the three (or four) monochrome images to produce high quality images with fine details of the specimen sample a novel configuration for a linear guide that is configured to operate an optical assembly and to control movement of lenses relative to each other within the optical assembly, which enables controlled movement of lenses within micrometers—which results in elimination/reduction of image distortion.

a novel configuration for focusing to expedite image capturing seamlessly while scanning an entire slide.

In operation, a tissue/fluid sample is placed beneath the optical assembly of the digital microscope. The user selects the sample type on a user interface and the control unit/control software selects the optimal optical condition and linear guide configuration for image capture. The device creates a digital image on the local file system based on image data received from the image sensor. The image is uploaded on the server for further distribution to pathologists/microbiologists. The invention additionally enable automated cell counting based on morphological features, and AI based segmentation and feature recognition.

FIG. 1 illustrates a microscope assembly 100 configured in accordance with the teachings of the present invention. Microscope assembly 100 comprises one or more of the following features:

a light source 102 that is configured to emit illuminating radiation that can be directed onto a sample 110 that is placed on a sample slide, or on a sample slide, for magnification and imaging using microscope assembly 100. Light source 102 may comprise one or both of a multi spectrum laser based illuminator and one or more LED illuminator. The primary function of light source 102 is to emit light that can be directed onto sample 110 for any of brightfield, darkfield and/or polarized microscopy techniques—for example, for use with histology or hematology related sample slides or for use with microfluidic cartridges under different staining conditions.

a light source controller 104—which may in certain embodiments comprise one or both of an LED illuminator controller, and a laser illuminator controller. The light source controller is communicably coupled with light source 102 and controls any one or more of (i) switching of light source 102 between an on state and an off state, (ii) intensity of illuminating radiation emitted from light source 102, (iii) wavelength(s) of illuminating radiation emitted from light source 102, and (iv) selection of a sub-set of illuminators disposed within light source controller 104 for illuminating a sample slide—for example, selecting one of an LED illuminator and a laser illuminator for illuminating a sample slide.

a focusing lens assembly 106 positioned between the sample slide and the light source 102, at an optical path along which light travels from light source 102 to the sample slide—which may comprise one or more than one lens elements, and that is configured to direct and focus illuminating radiation that is emitted from light source 102, onto sample 110. In an embodiment, focusing lens assembly 106 may be configured to produce light cones in such a way that it will match the light cone for the objective so that to maximise light capture and also indirectly will minimise the occurrences of photobleaching of sample. The collimated beams emerging from focusing lens assembly 106 are focused on a sample 110 that is placed on a sample slide upon motorized stage 108. In an embodiment (not shown in FIG. 1) the focusing lens assembly 106 may include, or may be positioned relative to a mirror element that is configured for directing illuminating radiations from light source 102, along a defined optical path and onto sample 110.

a motorized stage 108—which is configured for a sample slide to be positioned thereon, and for moving the sample slide along one or both of the x-axis and the y-axis in a plane. In an embodiment, motorized stage 108 may comprise two linear motorized stages with feedback—each enabling movement of the slide along one of the x-axis and y-axis in a plane.

a stepper/servo controller 112—which is communicably coupled with motorized stage 108 and which controls movement of motorized stage 108 along the x-axis and/or y-axis in a plane.

a slide identification scanner 114—comprising an optical scanner or a radio-frequency (RF) scanner configured to scan one or more unique identifiers (e.g. bar codes, optical codes, RF codes etc.) associated with a sample slide and that are disposed on the sample slide, for uniquely indexing images and data related to the sample that is disposed on the sample slide.

a motorized objective changer 118 having a plurality of objectives 116, 116' disposed thereon—comprising a switching assembly configured to selectively interpose one of the plurality of objectives 116, 116' between sample 110 (or the sample slide) and an image sensor, along an optical path along which illuminating radiations that originate from light source 102 and are incident on sample 110 and subsequently on the image sensor, are directed. The motorized objective changer enables selection of one of the plurality of objectives 116, 116' for magnifying sample 110 for the purposes of viewing/imaging—and can be implemented by any switching or moving assembly, including any one or more linear switching assemblies, or one or more circular/rotatory switching assemblies.

a plurality of objectives 116, 116'—wherein each of the plurality of objectives comprises an optical assembly that includes one or more lens elements, filter elements or other optical elements, and each of objectives 116, 116' has optical properties that are distinct or different from the remaining objectives in the plurality of objectives 116, 116'. Each objective 116, 116' may be mounted on motorized objective changer 118 for being selectively interposed between sample 110 and an image sensor, along an optical path along which illuminating radiations that originate from light source 102 and are incident on sample 110 and subsequently on the image sensor, are directed. In an embodiment, a first objective 116 has a lower magnification than a second objective 116'.

a plurality of focusing stages 120, 120'—wherein each focusing stage 120, 120' is associated with one of the objectives 116, 116' and may comprise a linear stage configured to selectively modify the position of an objective 116, 116' relative to sample 110 for the purposes of focusing the objective 116, 116' on the sample 110, for clear imaging or viewing of said sample 110. In an embodiment, each focusing stage 120, 120' may comprise a piezo/precision focusing stage, capable of altering the position of an objective 116, 116' along a z-axis.

a stepper/servo controller 122—which is communicably coupled with each of focusing stages 120, 120' and which controls movement of focusing stages 120, 120' along the z-axis.

a first camera or first imaging apparatus 128 configured for generating images of sample 110. In an embodiment, the first imaging apparatus 128 may have a first optical configuration and be configured for image acquisition of images having a first attributes set—which images may be used for the purposes of a first type of image analysis and sample state determination of sample 110. In an embodiment, the first imaging apparatus 128 may comprise a line scan camera or an area scan camera.

a second camera or second imaging apparatus 124 configured to generate images of sample 110. In an embodiment, the second imaging apparatus 124 may have a second optical configuration and may be configured for image acquisition of images having a second attributes set—which images may be used for the purposes of a second type of image analysis and sample state determination of sample 110. In an embodiment, the first optical configuration of first imaging apparatus 128 is different from the second optical configuration of second imaging apparatus 124. In a further embodiment, the second attribute set is different from the first attribute set. In yet another embodiment, the first type of image analysis and sample state determination is different from the second type of image analysis and sample state determination. In one embodiment, second imaging apparatus 124 may be used for the purposes of determining whether the objective 116, 116' has been properly positioned relative to sample 110 for clear imaging or viewing of sample 110.

a focusing optics assembly 126 comprising one or more optical elements interposed between focusing camera 124 and sample 110 along an optical path along which illuminating radiations that originate from light source 102 and are incident on sample 110 are directed. Focusing optics assembly includes one or more lens elements, filter elements or other optical elements.

a beam splitter 130 positioned at an optical path along which illuminating radiations that originate from light source 102 and are incident on sample 110 are directed, and configured to split illuminating radiation travelling from sample 110 between first imaging apparatus 128 and second imaging apparatus 124.

a motorized diffraction grating 132 (or transmission grating) that is selectively interposable between (and/or selectively removable from between) sample 110 (or the sample slide) and first imaging apparatus 128 at an optical path along which illuminating radiations that originate from light source 102 and are incident on sample 110 are directed. The motorized diffraction grating 132 (or transmission grating) may be interposed between sample 110 and first imaging apparatus 128 when first imaging apparatus 128 is being used for the purposes of raman spectroscopy related imaging and/or for fluorescence based imaging (as described in more details subsequently).

a motorized filter assembly 134 comprising one or more optical filters, that is selectively interposable between sample 110 and first imaging apparatus 128 at an optical path along which illuminating radiations that originate from light source 102 and are incident on sample 110 are directed. The motorized filter assembly may be interposed between sample 110 and first imaging apparatus 128 when first imaging apparatus 128 is being used for the purposes of imaging (as described in more details subsequently).

a processor 136 or a processing unit or a computational unit that is communicatively coupled with one or more of stepper/servo controller 112, stepper/servo controller 122, first imaging apparatus 128, second imaging apparatus 124, and/or slide identification scanner 114—and which may be configured to control the functionality or operations of one or more of these components. Processor 136 may additionally be coupled with a power supply 138, a memory 140 (i.e. a transitory or non-transitory memory or data storage device), a communication unit 142 configured for enabling network based communications, a display and user interface 144, configured to enable a user or operator to view images and to interface with the system 100, and a server and cloud integration module 146 configured to function as an interface between processor 136 and cloud based servers.

optionally, one or more of a processor implemented artificial intelligence based (or neural network based) region of interest detector, and a processor implemented artificial intelligence based (or neural network based) engine configured for sample state determination or sample state identification—each of which is described in more detail subsequently in this written description.

FIG. 2 illustrates a first method of slide sample analysis in accordance with the teachings of the present invention. The method of FIG. 2 may be performed using any of the microscope assemblies illustrated and described in connection with any of FIGS. 1 and 10. The methods steps are described below.

Step 202 comprises inserting a slide having disposed thereon, a sample intended for analysis. The slide is inserted onto or positioned on a motorized stage 108.

Step 204 comprises setting at a motor driver that controls movement of motorized stage 204, a set of reference co-ordinates (along the x and y axes) corresponding to the boundaries of the slide.

Step 206 comprises commencing imaging of the slide at a starting location or a starting position within the slide, Step 208 comprises implementing an auto-focus mechanism to determine an appropriate focus for an objective 116, 116' for the purposes of optimal imaging of the sample.

Subsequent to properly focusing the objective 116, 116', an image of a portion of the sample is acquired at step 210 (for example, an image at 1000× magnification).

At step 212, the acquired image is stored in a memory 140 along with position coordinates defining the position of the imaged portion of the sample within the overall boundaries of the slide.

At step 214 the slide is moved by a fixed first offset (e.g. 70 micrometers) along the X axis (for example, by movement effected through the motorized stage 108).

Step 216 comprises checking whether the slide has been fully imaged along the x axis and if so, at step 218 the slide is moved by a fixed second offset (e.g. 70 micrometers) along the Y axis (for example, by movement effected through the motorized stage 108). If the determination at step 216 results in a finding that the slide has not been fully imaged along the x-axis, then step 220 comprises checking whether the slide has been fully imaged along the y axis and if so, further imaging of the slide is terminated at step 222. If on the other hand, the determination at step 220 results in a finding that the slide has not been fully imaged along the y-axis, then the method loops back to step 208 for further image acquisition of the slide.

Once the entire slide has been imaged, the method proceeds to step 224, wherein the several images of the slide that have been generated at steps 210 and steps 212 are combined together and a final combined or mosaiced image is generated at step 226.

The combined image from step 226 is provided as input to a first AI engine (for example a neural network based processor implemented engine) that has been trained to identify particular regions of interest within the sample (e.g. one or more regions within the sample that are indicative of disease states or other physiological states) based on image data within the combined image. At step 230, the AI engine outputs data or a score that indicates whether the combined image includes one or more regions of interest (of a type that the first AI engine has been trained to identify), along with position coordinates identifying the position of the one or more regions of interest within the slide.

The positions of the identified regions of interest within the slide are thereafter subjected to raman spectroscopy at step 232—and at step 234 the raman spectroscopy data corresponding to each such position, along with the positional coordinates are stored in a memory 140.

At step 236, the raman spectroscopy data is provided as input to a second AI engine (for example a neural network based processor implemented engine) that has been trained to determine sample states i (e.g. one or more disease states) based on spectroscopy data. At step 238, the second AI engine outputs a score that indicates the likelihood of existence of a state of interest (i.e. a sample state of a type that the second AI engine has been trained to identify) within the sample—and this score can be used to confirm or verify the findings at step 228 and 230 of the method as described above.

At step 240 based on the output of the second AI engine, the method arrives at determination of whether the sample includes or tests positive for a state of interest which the second AI engine has been trained to identify. The results of the determination may be displayed or communicated to a user on a display 144.

Figure 3:
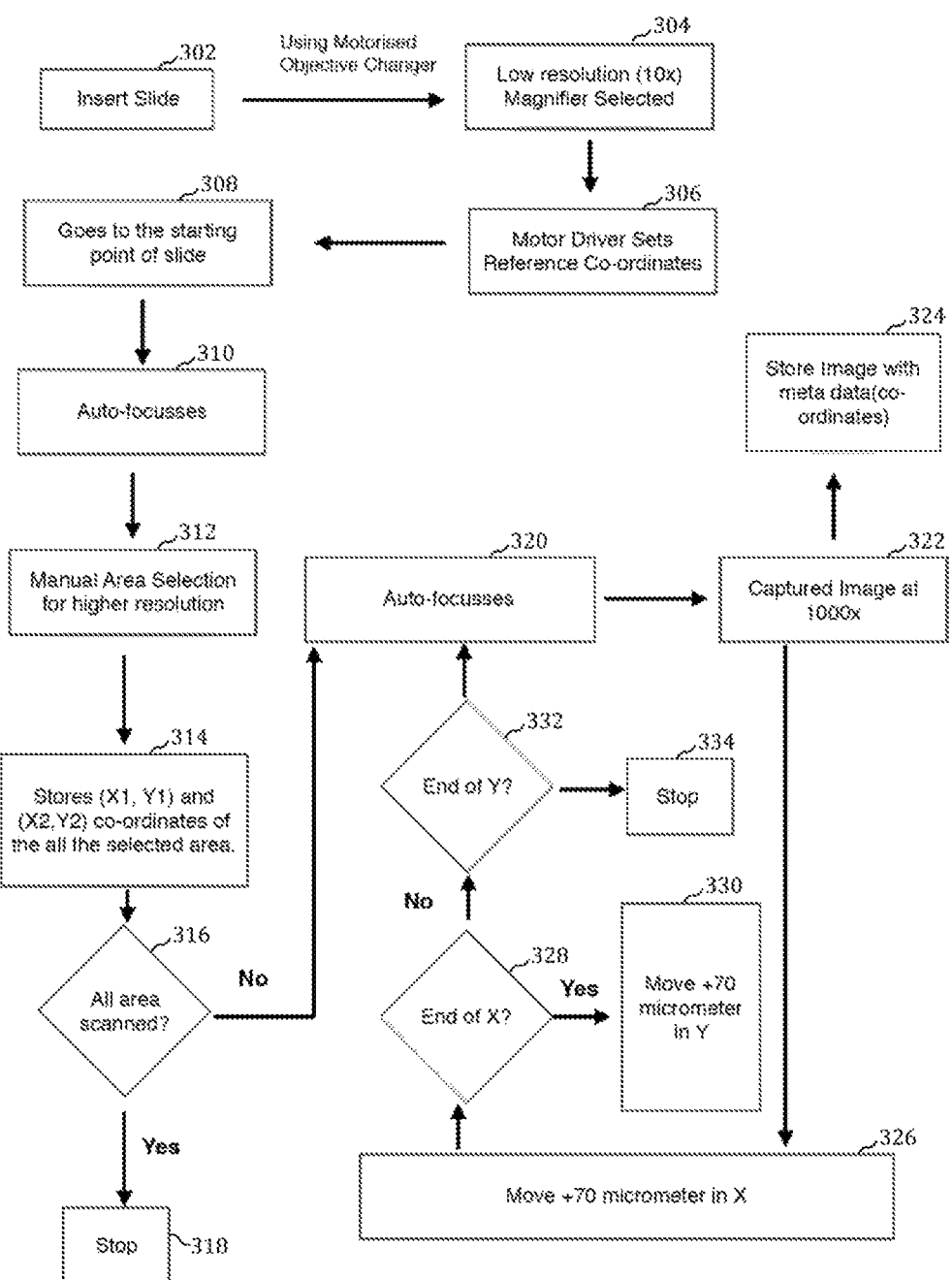

FIG. 3 illustrates a second method of slide sample analysis in accordance with the teachings of the present invention. The method of FIG. 3 may be performed using system 100 of FIG. 1. The methods steps are described below.

Step 302 comprises inserting a slide having disposed thereon, a sample intended for analysis. The slide is inserted onto or positioned on a motorized stage 108.

Step 304 comprises selecting from among a plurality of objectives 116, 116', a first objective 116, that has a lower magnification (e.g. 10× magnification) when compared to at least a second objective 116' among the plurality of objectives 116, 116'.

Step 306 comprises setting at a motor driver that controls movement of motorized stage 204, a set of reference co-ordinates (along the x and y axes) corresponding to the boundaries of the slide.

Step 308 comprises commencing imaging of the slide at a starting location or a starting position within the slide, Step 310 comprises implementing an auto-focus mechanism to determine an appropriate focus for an objective 116, 116' for the purposes of optimal imaging of the sample.

Subsequent to properly focusing the objective 116, 116', an image of the slide is acquired and at step 312, user input is received through a display or user interface 144 from a user, selecting within the image of the slide, a selected region of the slide or sample for imaging and analysis at a higher resolution (for example, at 1000× magnification).

At step 314, the coordinates of the selected region of the slide (i.e. coordinates X1:Y1, X2:Y2) are stored within a memory 140

Step 316 comprises checking whether the selected region of the slide has been fully imaged and if so, further imaging of the selected region is terminated at step 318. If the determination at step 316 results in a finding that the selected region has not been fully imaged, the method proceeds to execute step 320 and onwards.

Step 320 comprises implementing an auto-focus mechanism to determine an appropriate focus for an objective 116, 116' for the purposes of optimal imaging of the selected region of the slide.

Thereafter, a second objective 116' is selected from among the plurality of objectives 116, 116', wherein the second objective 116' has a higher lower magnification (e.g. 1000× magnification) when compared to the first objective 116 that has been used for the purposes of manual area selection at step 312.

At step 322, the second objective 116' is used to transmit light that is incident on the sample/slide, onto an image sensor so that an image of a portion of the selected region of the slide is acquired.

At step 324, the acquired image is stored in a memory 140 along with position coordinates defining the position of the imaged portion of the sample within the overall boundaries of the slide.

At step 326 the slide is moved by a fixed first offset (e.g. 70 micrometers) along the X axis (for example, by movement effected through the motorized stage 108).

Step 328 comprises checking whether the selected region of the slide has been fully imaged along the x axis and if so, at step 330 the slide is moved by a fixed second offset (e.g. 70 micrometers) along the Y axis (for example, by movement effected through the motorized stage 108). If the determination at step 328 results in a finding that the selected region of the slide has not been fully imaged along the x-axis, then step 332 comprises checking whether the selected region of the slide has been fully imaged along the y axis and if so, further imaging of the slide is terminated at step 334. If on the other hand, the determination at step 332 results in a finding that the selected region of the slide has not been fully imaged along the y-axis, then the method loops back to step 320 for further image acquisition of the selected region of the slide.

While not shown in the flowchart of FIG. 3, it would be understood that the images generated through the method of FIG. 3, may be combined into a single image and subjected to AI based image analysis and raman spectroscopy analysis to determine whether a state of interest exists within the combined image that has been thus generated.

Figure 4:
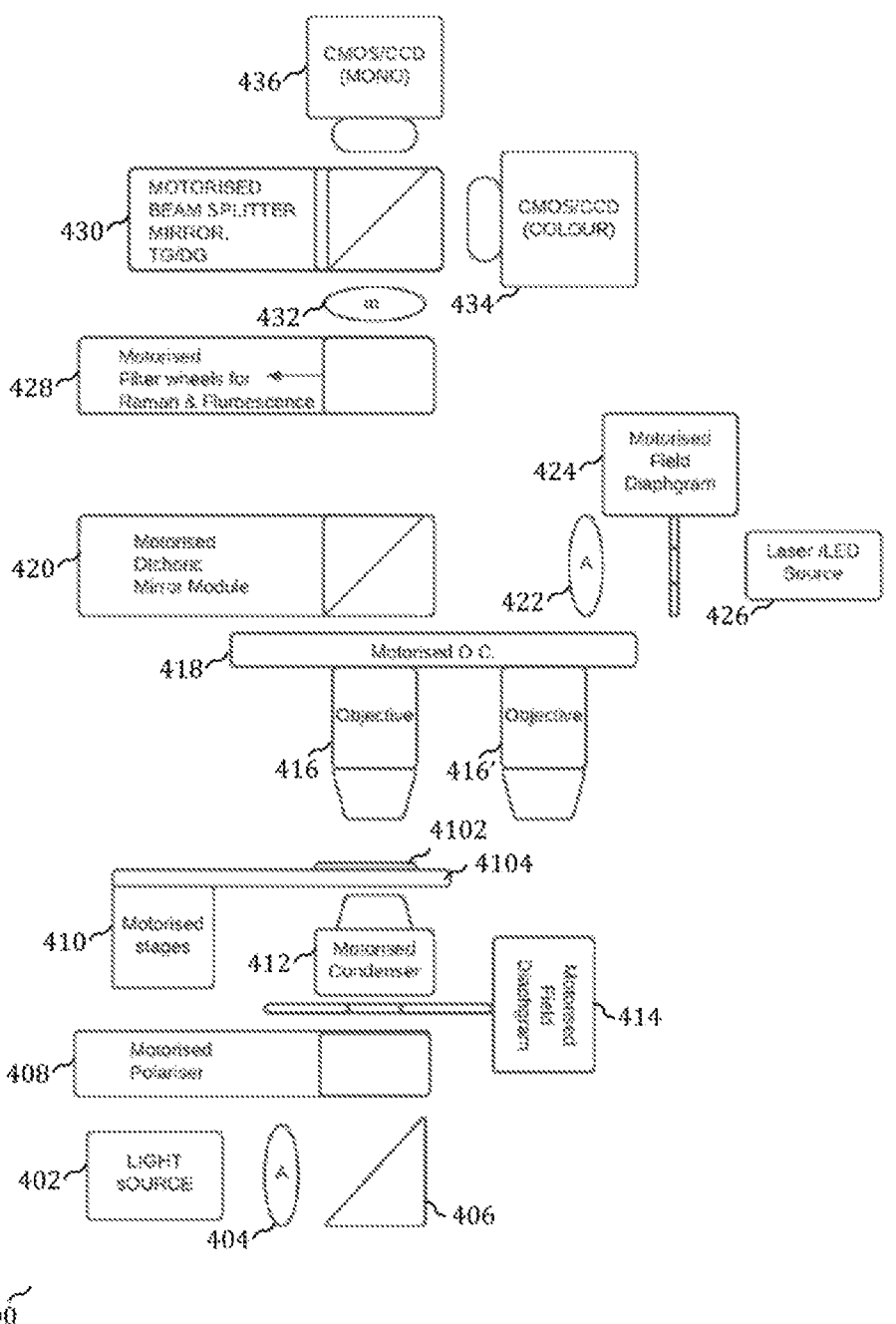
FIG. 4 illustrates a first embodiment of a digital microscope assembly of a kind that has been more generally described in connection with FIG. 1.

FIG. 4 illustrates a first embodiment of a digital microscope assembly 400 of a kind that has been more generally described in connection with FIG. 1.

Digital microscope assembly 400 comprises a light source 402 that is configured to emit illuminating radiation that can be directed onto a sample 4102 that is placed on a sample slide 4104 for magnification and imaging using microscope assembly 400. Light source 402 may comprise one or both of a multi spectrum laser based illuminator and one or more LED illuminator. The primary function of light source 402 is to emit light that can be directed onto sample 4102 for any of brightfield, darkfield and/or polarized microscopy techniques—for example, for use with histology or hematology related sample slides or for use with microfluidic cartridges under different staining conditions. The light source can additionally comprise one or more mirrors, filters and lens assemblies—which may by selected according to the sample staining methods or conditions that have been used.

Digital microscope assembly 400 additionally comprises a lens assembly 404 (which may comprise a single lens or a plurality of lenses or optical elements combined together) that is configured to produce collimated beams of different wavelengths of light originating from light source 402.

Digital microscope assembly 400 further comprises mirror 4306 to direct or propagate light along a desired optical path or axis such that light emitted from light source 402 is directed onto sample 4102 and through an objective 416, 416' onto an imaging sensor within an imaging apparatus 434, 436.

A motorized polariser 408 is positioned along an optical path between light source 402 and sample 4102—and comprises one or more motorized stages configured to selectively introduce linear and/or circular polarizers into the optical path—so as to polarize light emitted from light source 402. In the event that the motorized polarized 408 is used to selectively introduce a linear polarizer, the linear polarizer can be rotated about its axis to control the angle of polarization. The polarizer is used for phase contrast microscopy in use with bright field microscopy.

A motorized field diaphragm 414 positioned along the optical path and between light source 402 and sample 4102, is used to control the amount of light entering into the microscope and thus helps in imaging the slides in a more controlled manner.

A motorized condenser 412 may be positioned along the optical path and between light source 402 and sample 4102, and is configured to precisely controls the light cone which is passed through the sample plane for the objective 416, 416' to capture maximum light from the space while minimising photo bleaching.

Motorized stage(s) 410 comprises a motorized linear stage or circular stage that is configured for moving a slide (e.g. the sample slide) 4104 in a plane (X, Y plane). In an embodiment motorized stage 410 may comprise two linear stages with feedback capabilities for positional accuracy.

The digital microscope assembly 400 includes a motorized objective changer 418 having a plurality of objectives 416, 416' disposed thereon—comprising a switching assembly configured to selectively interpose one of the plurality of objectives 416, 416' between sample 4102 and an image sensor, along an optical path along which illuminating radiations that originate from light source 402 and are incident on sample 4102 and subsequently on the image sensor, are directed. The motorized objective changer 418 enables selection of one of the plurality of objectives 416, 416' for magnifying sample 4102 for the purposes of viewing/imaging—and can be implemented by any switching or moving assembly, including any one or more linear switching assemblies, or one or more circular/rotatory switching assemblies.

A plurality of objectives 416, 416' is provided within assembly 400—wherein each of the plurality of objectives comprises an optical assembly that includes one or more lens elements, filter elements or other optical elements, and each of objectives 416, 416' has optical properties that are distinct or different from the remaining objectives in the plurality of objectives 416, 416'. Each objective 416, 416' may be mounted on motorized objective changer 418 for being selectively interposed between sample 4102 and an image sensor, along an optical path along which illuminating radiations that originate from light source 402 and are incident on sample 4102 and subsequently on the image sensor, are directed. In an embodiment, a first objective 416 has a lower magnification than a second objective 416'.

The digital microscope assembly 400 also includes a laser/LED source 426 which provides a source of light that is used for excitation of sample 4102 in cases where fluorescence scanning techniques are being implemented for biological samples.

A motorized field diaphragm 424 may be included within assembly 400—wherein said diaphragm 424 is configured to control the amount of light (originally emitted by laser/LED source 426) that is projected onto the sample 4102—for the purposes of controlling photo bleaching of sample 4102.

The assembly 400 may additionally include a lens assembly 422 positioned and configured to project a collimated light beam that originates from laser/LED source 426 onto a motorized stage 420 comprising a dichroic mirror assembly.

The digital microscope assembly may include a motorized stage 420 comprising a dichroic mirror assembly that includes one or more than one dichroic mirrors and/or filters that are selectively interposable between an imaging apparatus 434, 436 and a sample 4102 along an optical path between the two. The motorized stage 420 may be used to selectively interpose the dichroic elements at an optical path for the purpose of implementing fluorescence techniques and/or raman excitation of samples. The dichroic mirror assembly is configured and positioned to direct light emitted from laser/LED source 426, onto the sample 4102, whereinafter, said light may be scattered or reflected off said sample 4102 and directed along an optical path between sample 4102 and an imaging apparatus 434, 436.

Motorized filter wheel(s) 428 comprises one or more motorized stages that can be used to selectively interpose filters along an optical path, and between sample 4102 and an image sensor of an imaging apparatus 436,

434. In an embodiment, the motorized filter wheel(s) 428 enable control over the detection of samples under specific filters for both fluorescence and raman techniques.

In an embodiment of assembly 400, a tube lens assembly 432 may be positioned along an optical path and between motorized filter wheel(s) 428 and beam splitter 430. The tube lens assembly 432 is configured for focusing images on the plane of an image sensor—and may be motorized so that it can move along the optical axis (in the direction of the z-axis) to ensure proper focus of light transmitted from sample 4102 onto an image sensor.

A motorized beam splitter 430 may be provided within assembly 400, positioned at an optical path along which illuminating radiations that originate from light source 402 and are incident on sample 4102 are directed, and configured to split illuminating radiation travelling from sample 4102 between a first imaging apparatus 436 and a second imaging apparatus 434. The motorized beam splitter 430 may include one or more mirrors, or lens elements, one or more diffraction gratings DG, and/or one or more transmission gratings TG, and is configured for selectively directing light transmitted from sample 4102 onto different imaging sensors for selectively implementing fluorescence, brightfield, and raman spectroscopy based imaging and analysis techniques.

The digital microscope assembly 400 may include a first camera or first imaging apparatus 436 configured for generating images of sample 4102 for the purposes of image analysis and sample state determination of sample 4102. In an embodiment, the first imaging apparatus 436 may comprise a monochrome image sensor (e.g. a monochrome CMOS/CCD image sensor). The monochrome image sensor may be used for obtaining high quality images.

The digital microscope assembly 400 may also include a second camera or second imaging apparatus 434 configured for generating images of sample 4102 for the purposes of image analysis and sample state determination of sample 4102. In an embodiment, the second imaging apparatus 436 may comprise a color image sensor (e.g. a color CMOS/CCD image sensor). The color image sensor may be used for capturing high resolution color images.

Figure 5:
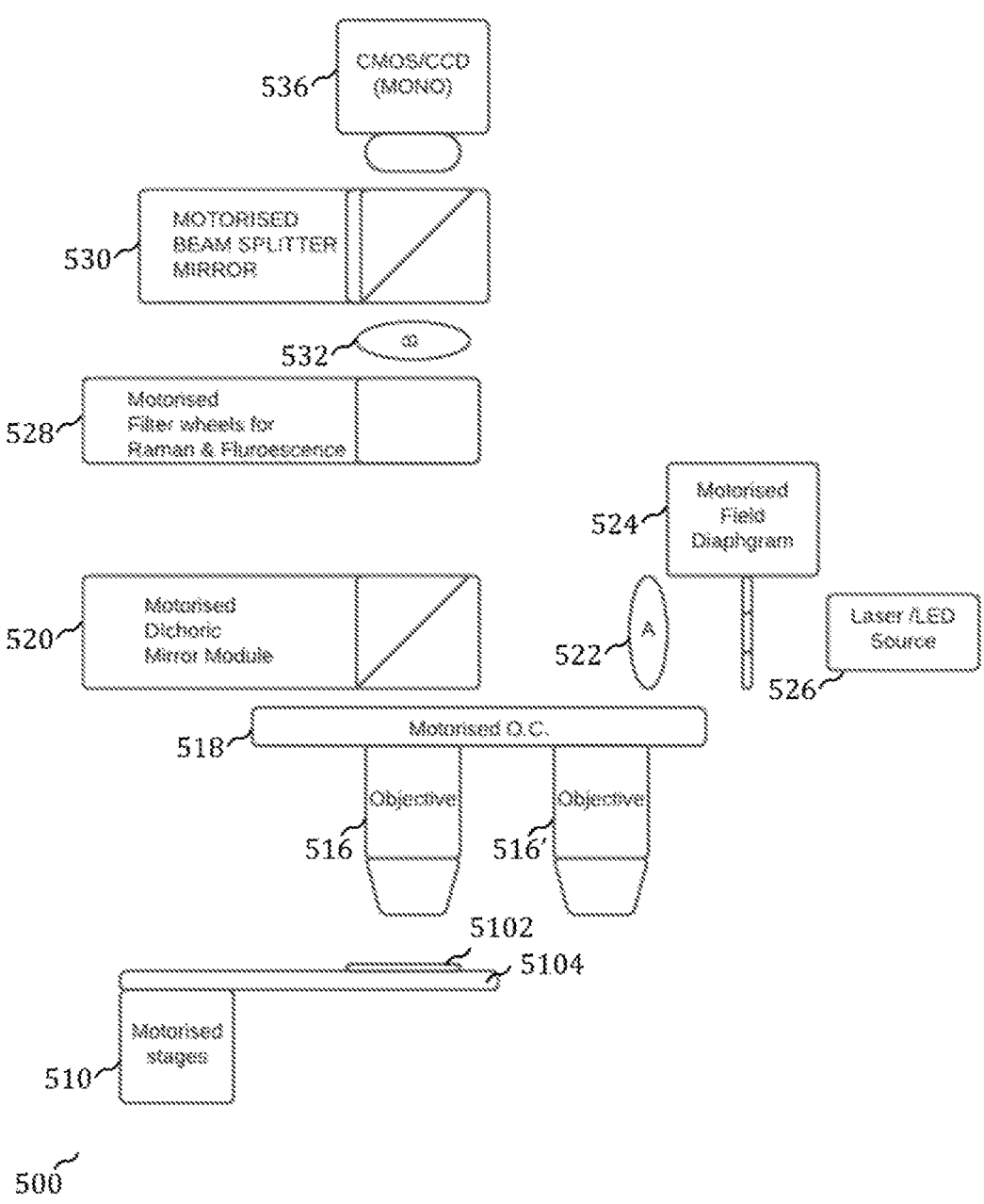
FIGS. 5 and 6 illustrate a second embodiment of a digital microscope assembly of a kind that has been more generally described in connection with FIG. 1 and that is used for microscope imaging based on fluorescence techniques.
Figure 6:
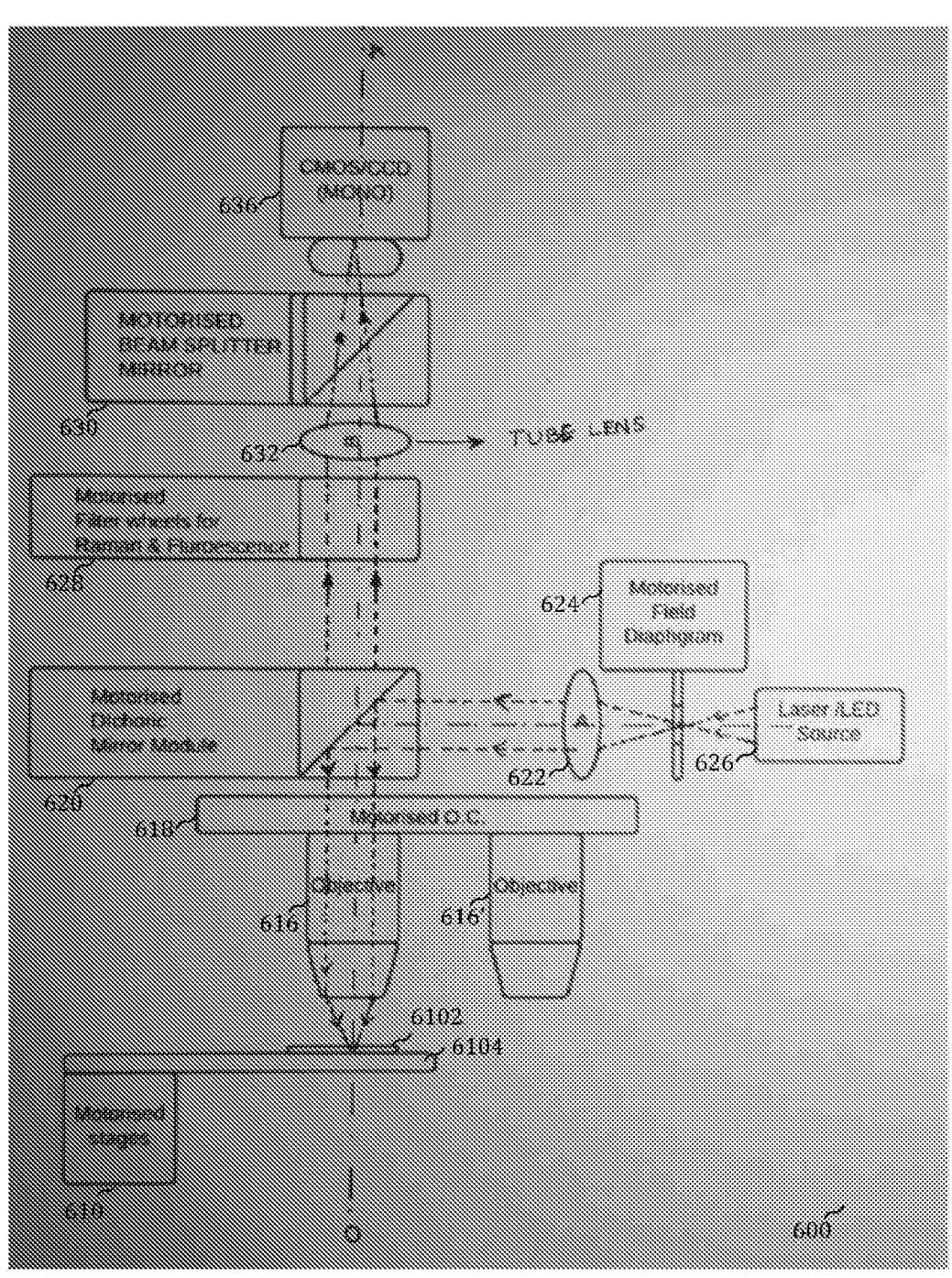

FIGS. 5 and 6 illustrates a second embodiment of a digital microscope assembly 500, 600 of a kind that has been more generally described in connection with FIG. 1 and that is configured for implementing fluorescence based techniques for sample imaging and analysis.

Digital microscope assembly 500, 600 comprises a light source (not shown) that is configured to emit illuminating radiation that can be directed onto a sample 5102, 6102 that is placed on a sample slide 5104, 6104 for magnification and imaging using microscope assembly 500, 600. The light source may comprise one or both of a multi spectrum laser based illuminator and one or more LED illuminator. The primary function of the light source is to emit light that can be directed onto sample 5102, 6102 for any of brightfield, darkfield and/or polarized microscopy techniques—for example, for use with histology or hematology related sample slides or for use with microfluidic cartridges under different staining conditions. The light source can additionally comprise one or more mirrors, filters and lens assemblies—which may be selected according to the sample staining methods or conditions that have been used. For the purposes of implementing fluorescence techniques, the light source may comprise a laser source, or may comprise a plurality of laser sources, LEDs, or halogen based light source(s) having emission filters selected for transmitting the required wavelength channel(s).

Digital microscope assembly 500, 600 may additionally comprise a lens assembly (also not shown, and which may comprise a single lens or a plurality of lenses or optical elements combined together) that is configured to produce collimated beams of different wavelengths of light originating from the light source.

Digital microscope assembly 500, 600 may also comprise a mirror (not shown) to direct or propagate light along a desired optical path or axis 'O' such that light emitted from the light source is directed onto sample 5102, 6102 and through an objective 516, 516', 616, 616' onto an imaging sensor within an imaging apparatus 536, 636.

Motorized stage(s) 510, 610 comprises a motorized linear stage or circular stage that is configured for moving a slide (e.g. the sample slide) 5104, 6104 in a plane (X, Y plane). In an embodiment motorized stage 510, 610 may comprise two linear stages with feedback capabilities for positional accuracy.

The digital microscope assembly 500, 600 includes a motorized objective changer 518, 618 having a plurality of objectives 516, 516', 616, 616' disposed thereon—comprising a switching assembly configured to selectively interpose one of the plurality of objectives 516, 516', 616, 616' between sample 5102, 6102 and an image sensor, along an optical path 'O' along which illuminating radiations that originate from a light source and are incident on sample 5102, 6102 and subsequently on an image sensor, are directed. The motorized objective changer 518, 618 enables selection of one of the plurality of objectives 516, 516', 616, 616' for magnifying sample 5102, 6102 for the purposes of viewing/imaging—and can be implemented by any switching or moving assembly, including any one or more linear switching assemblies, or one or more circular/rotatory switching assemblies.

A plurality of objectives 516, 516', 616, 616' is provided within assembly 500, 600—wherein each of the plurality of objectives comprises an optical assembly that includes one or more lens elements, filter elements or other optical elements, and each of objectives 516, 516', 616, 616' has optical properties that are distinct or different from the remaining objectives in the assembly 500, 600. Each objective 516, 516', 616, 616' may be mounted on motorized objective changer 518, 618 for being selectively interposed between sample 5102, 6102 and an image sensor, along an optical path along which illuminating radiations that originate from the light source and are incident on the sample 5102, 6102 and subsequently on an image sensor, are directed. In an embodiment, a first objective 516, 616 has a lower magnification than a second objective 516', 616'.

The digital microscope assembly 500, 600 also includes a laser/LED source 526, 626 which provides a source of light that is used for excitation of sample 5102, 6102 in cases where fluorescence scanning techniques are being implemented for biological samples.

A motorized field diaphragm 524, 624 may be included within assembly 500, 600—wherein said diaphragm 524, 624 is configured to control the amount of light (originally emitted by laser/LED source 526, 626) that is projected onto the sample 5102, 6102—for the purposes of controlling photo bleaching of sample 5102, 6102.

The digital microscope assembly may include a motorized stage 520, 620 comprising one or more than one dichroic mirrors and/or filters that are selectively interposable between an imaging apparatus 536, 636 and a sample 5102, 6102 along an optical path between the two. The motorized stage 520, 620 may be used to selectively interpose the dichroic elements at an optical path for the purpose of implementing fluorescence techniques and/or raman excitation of samples. The motorized stage 520, 620 may be used in synchronization with the laser/LED light source 526/626. As shown, the dichroic mirrors may be selectively positioned such that illuminating radiation from laser/LED source 526, 626 are directed onto sample 5102, 6102, and the fluorescence emission photons that are emitted through excitation of sample 5102, 6102 are collected through a selectively positioned objective 516, 516' 616, 616' such that said photons are directed onto an image sensor 536, 636 and forms an image of sample 5102, 6102.

Motorized filter wheel(s) 528, 628 comprises one or more motorized stages that can be used to selectively interpose filters and along an optical path, and between sample 5102, 6102 and an image sensor of an imaging apparatus 536, 636. In an embodiment, the motorized filter wheel(s) 528, 628 enable control over the detection of samples under specific filters for both fluorescence and raman techniques.

In an embodiment of assembly 500, 600, a tube lens assembly 532, 632 may be positioned along an optical path and between motorized filter wheel(s) 528, 628 and beam splitter 530, 630. The tube lens assembly 532, 632 is configured for focusing images on the plane of an image sensor—and may be motorized so that it can move along the optical axis (in the direction of the z-axis) to ensure proper focus of light transmitted from sample 5102, 6102 onto an image sensor 536, 636.

A motorized beam splitter 530, 630 may be provided within assembly 500, 600 positioned at an optical path along which illuminating radiations that originate from a light source and are incident on sample 5102, 6102 are directed, and configured to split illuminating radiation travelling from sample 5102, 6102 between a first imaging apparatus 536, 636 and a second imaging apparatus (not shown). The motorized beam splitter 530, 630 may include one or more mirrors, or lens elements, one or more diffraction gratings DG, and/or one or more transmission gratings TG, and is configured for selectively directing light transmitted from sample 5102, 6102 onto different imaging sensors for selectively implementing fluorescence, brightfield, and raman spectroscopy based imaging and analysis techniques.

The digital microscope assembly 500, 600 may include a first camera or first imaging apparatus 536, 636 configured for generating images of sample 5102, 6102 for the purposes of image analysis and sample state determination of sample 5102, 6102. In an embodiment, the first imaging apparatus 536, 636 may comprise a monochrome image sensor (e.g. a monochrome CMOS/CCD image sensor). The monochrome image sensor may be used for obtaining high quality images. For sensitive imaging application that implement fluorescence techniques, monochrome CMOS/CCD image sensors may be used, and one or more image processing algorithms combine images captured through different fluorescence emission filters. The images thus generated are then input to an AI engine/neural network to differentiate cell or sample features to identify state information corresponding to the sample 5102, 6102.

The digital microscope assembly 500, 600 may also include a second camera or second imaging apparatus (not shown) configured for generating images of sample 5102, 6102 for the purposes of image analysis and sample state determination of sample 5102, 6102. In an embodiment, the second imaging apparatus may comprise a color image sensor (e.g. a color CMOS/CCD image sensor). The color image sensor may be used for capturing high resolution color images.

Figure 7:
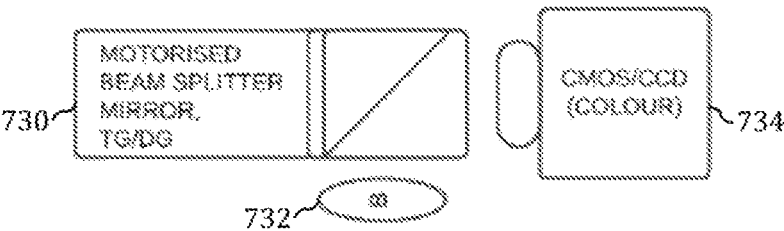
FIGS. 7 and 8 illustrate a third embodiment of a digital microscope assembly of a kind that has been more generally described in connection with FIG. 1 and that is used for microscope imaging based on brightfield techniques.
Figure 7:
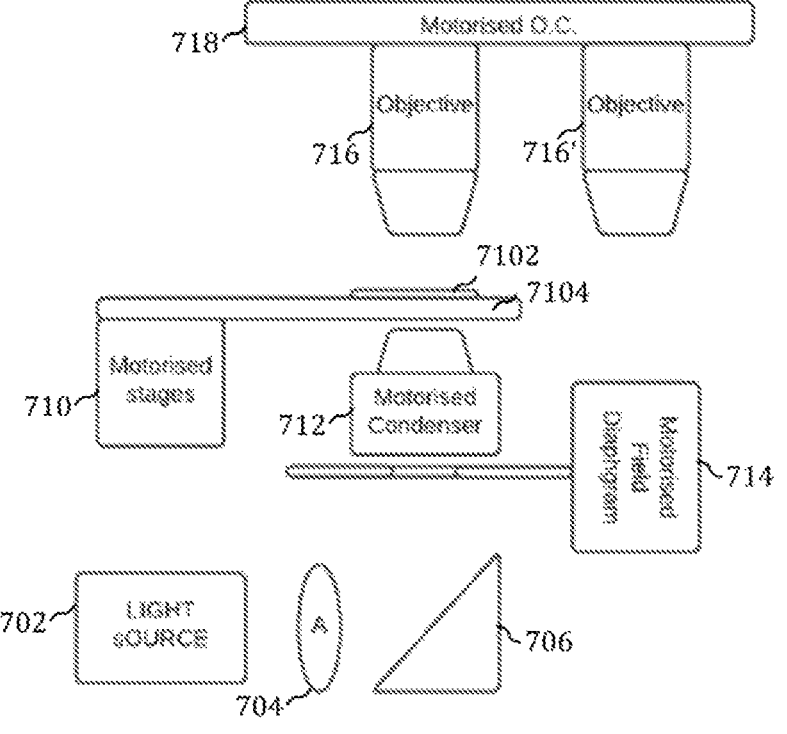
Figure 8:
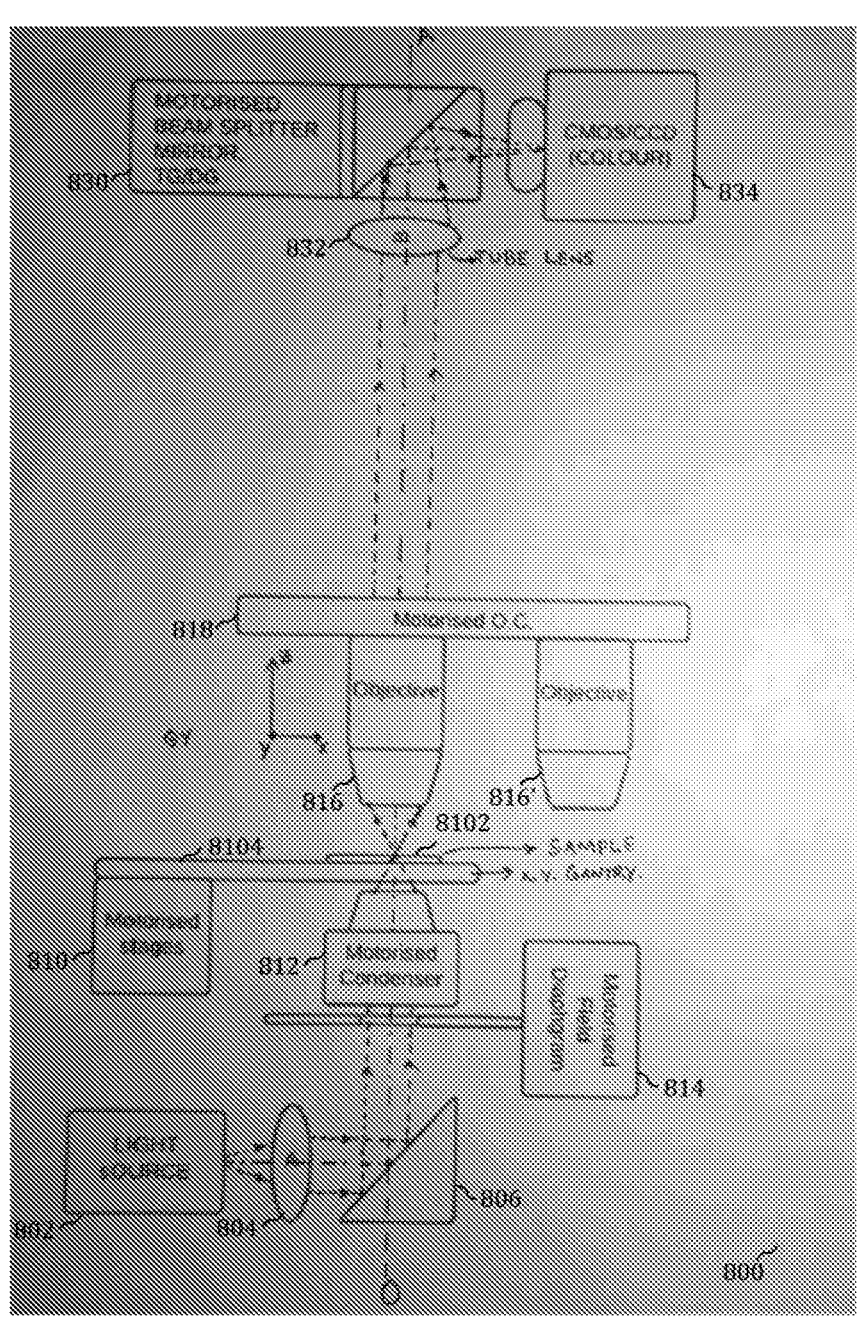

FIGS. 7 and 8 illustrates a third embodiment of a digital microscope assembly 700, 800 of a kind that has been more generally described in connection with FIG. 1 and that is configured for implementing brightfield based techniques for sample imaging and analysis.

Digital microscope assembly 700, 800 comprises a light source 702, 802 that is configured to emit illuminating radiation that can be directed onto a sample 7102, 8102 that is placed on a sample slide 7104, 8104 for magnification and imaging using microscope assembly 700, 800. The light source may comprise one or both of a multi spectrum laser based illuminator and one or more LED illuminator. The primary function of the light source is to emit light that can be directed onto sample 7102, 8102 for brightfield microscopy techniques—for example, for use with histology or hematology related sample slides or for use with microfluidic cartridges under different staining conditions. The light source can additionally comprise one or more mirrors, filters and lens assemblies—which may be selected according to the sample staining methods or conditions that have been used. For brightfield imaging applications multispectral wavelengths of leigh (e.g. red, blue and green) and bright white light are used. The utilization of diverse wavelengths of light enables imaging different layers of the sample with respect to the white light.

Digital microscope assembly 700, 800 may additionally comprise a lens assembly 704, 804 (which may comprise a single lens or a plurality of lenses or optical elements combined together) that is configured to produce collimated beams of different wavelengths of light originating from light source 702, 802.

Digital microscope assembly 700, 800 may also comprise a mirror 706, 806 to direct or propagate light along a desired optical path or axis 'O' such that light emitted from the light source is directed onto sample 7102, 8102 and through an objective 716, 716', 816, 816' onto an imaging sensor within an imaging apparatus 534, 634.

A motorized field diaphragm 714, 814 positioned along the optical path 'O' and between light source 702, 802 and sample 7102, 8102 is used to control the amount of light entering into the microscope and thus helps in imaging the slides in a more controlled manner.

A motorized condenser 712, 812 may be positioned along the optical path 'O' and between light source 702, 802 and sample 7102, 8102 and is configured to precisely controls the light cone which is passed through the sample plane for the objective 716, 716', 816, 816' to capture maximum light from the space while minimising photo bleaching.

Motorized stage(s) 710, 810 comprises a motorized linear stage or circular stage that is configured for moving a slide (e.g. the sample slide) 7104, 8104 in a plane (X, Y plane). In an embodiment motorized stage 710, 810 may comprise two linear stages with feedback capabilities for positional accuracy.

The digital microscope assembly 700, 800 includes a motorized objective changer 718, 818 having a plurality of objectives 716, 716', 816, 816' disposed thereon—comprising a switching assembly configured to selectively interpose one of the plurality of objectives 716, 716', 816, 816' between sample 7102, 8102 and an image sensor 734, 834 along an optical path 'O' along which illuminating radiations that originate from a light source 702, 802 and are incident on sample 7102, 8102 and subsequently on an image sensor 734, 834, are directed. The motorized objective changer 718, 818 enables selection of one of the plurality of objectives 716, 716', 816, 816' for magnifying sample 7102, 8102 for the purposes of viewing/imaging—and can be implemented by any switching or moving assembly, including any one or more linear switching assemblies, or one or more circular/rotatory switching assemblies.

A plurality of objectives 716, 716', 816, 816' is provided within assembly 700, 800—wherein each of the plurality of objectives comprises an optical assembly that includes one or more lens elements, filter elements or other optical elements, and each of objectives 716, 716', 816, 816' has optical properties that are distinct or different from the remaining objectives in the assembly 700, 800. Each objective 716, 716', 816, 816' may be mounted on motorized objective changer 718, 818 for being selectively interposed between sample 7102, 8102 and an image sensor 734, 834 along an optical path 'O' along which illuminating radiations that originate from the light source 702, 802 and are incident on the sample 7102, 8102 and subsequently on an image sensor 734, 834 are directed. In an embodiment, a first objective 716, 816 has a lower magnification than a second objective 716', 816'.

In an embodiment of assembly 700, 800, a tube lens assembly 732, 832 may be positioned along an optical path 'O' and between objective 716, 716' 816, 816' and beam splitter 730, 830. The tube lens assembly 732, 832 is configured for focusing images on the plane of an image sensor 734, 834—and may be motorized so that it can move along the optical axis (in the direction of the z-axis) to ensure proper focus of light transmitted from sample 7102, 8102 onto an image sensor 734, 834.

A motorized beam splitter 730, 830 may be provided within assembly 700, 800 positioned at an optical path 'O' along which illuminating radiations that originate from a light source 702, 802 and are incident on sample 7102, 8102 are directed, and configured to split illuminating radiation travelling from sample 7102, 8102 between a first imaging apparatus (not shown) and a second imaging apparatus 734, 834. The motorized beam splitter 730, 830 may include one or more mirrors, or lens elements, one or more diffraction gratings DG, and/or one or more transmission gratings TG, and is configured for selectively directing light transmitted from sample 7102, 8102 onto imaging sensor 734, 834 for selectively implementing, brightfield based imaging and analysis techniques.

The digital microscope assembly 700, 800 may include a first camera or first imaging apparatus (not shown) configured for generating images of sample 7102, 8102 for the purposes of image analysis and sample state determination of sample 7102, 8102. In an embodiment, the first imaging apparatus may comprise a monochrome image sensor (e.g. a monochrome CMOS/CCD image sensor). The monochrome image sensor may be used for obtaining high quality images. For sensitive imaging application that implement fluorescence techniques, monochrome CMOS/CCD image sensors may be used, and one or more image processing algorithms combine images captured through different fluorescence emission filters. The images thus generated are then input to an AI engine/neural network to differentiate cell or sample features to identify state information corresponding to the sample 7102, 8102.

The digital microscope assembly 700, 800 may also include a second camera or second imaging apparatus 734, 834 configured for generating images of sample 7102, 8102 for the purposes of image analysis and sample state determination of sample 7102, 8102 based on brightfield techniques. In an embodiment, the second imaging apparatus 734, 834 may comprise a color image sensor (e.g. a color CMOS/CCD image sensor). The color image sensor may be used for capturing high resolution color images for brightfield imaging. The images acquired by an image sensor of second imaging apparatus 734, 834 are then provided as inputs to an AI engine or a neural network for enabling identification of state data corresponding to a sample 7102, 8102 (for example for identification and differentiation of cell features for diagnosis and area of interest identification).

FIG. 9 illustrates a fourth embodiment of a digital microscope assembly of a kind that has been more generally described in connection with FIG. 1 and that is used for state information determination based on raman spectroscopy.

Digital microscope assembly 900 comprises a light source (not shown) that is configured to emit illuminating radiation that can be directed onto a sample 9102 that is placed on a sample slide 9104 for magnification and imaging using microscope assembly 900. The light source may comprise one or both of a multi spectrum laser based illuminator and one or more LED illuminator. The primary function of the light source is to emit light that can be directed onto sample 9102 for spectroscopy based techniques. The light source can additionally comprise one or more mirrors, filters and lens assemblies—which may be selected according to the sample staining methods or conditions that have been used. For the purposes of implementing fluorescence techniques, the light source may comprise a laser source, or may comprise a plurality of laser sources, LEDs, or halogen based light source(s) having emission filters selected for transmitting the required wavelength channel(s).

Digital microscope assembly 900 may additionally comprise a lens assembly (also not shown, and which may comprise a single lens or a plurality of lenses or optical elements combined together) that is configured to produce collimated beams of different wavelengths of light originating from the light source.

Digital microscope assembly 900 may also comprise a mirror (not shown) to direct or propagate light along a desired optical path or axis 'O' such that light emitted from the light source is directed onto sample 9102 and through an objective 916, 916' onto an imaging sensor within an imaging apparatus 936.

Motorized stage(s) 910 comprises a motorized linear stage or circular stage that is configured for moving a slide (e.g. the sample slide) 9104 in a plane (X, Y plane). In an embodiment motorized stage 910 may comprise two linear stages with feedback capabilities for positional accuracy.

The digital microscope assembly 900 includes a motorized objective changer 918, having a plurality of objectives 916, 916' disposed thereon—comprising a switching assembly configured to selectively interpose one of the plurality of objectives 916, 916' between sample 9102 and an image sensor, along an optical path 'O' along which illuminating radiations that originate from a light source and are incident on sample 9102 and subsequently on an image sensor, are directed. The motorized objective changer 918 enables selection of one of the plurality of objectives 916, 916' for magnifying sample 9102 for the purposes of viewing/imaging—and can be implemented by any switching or moving assembly, including any one or more linear switching assemblies, or one or more circular/rotatory switching assemblies.

A plurality of objectives 916, 916' is provided within assembly 900—wherein each of the plurality of objectives 916, 916' comprises an optical assembly that includes one or more lens elements, filter elements or other optical elements, and each of objectives 916, 916' has optical properties that are distinct or different from the remaining objectives in the assembly 900. Each objective 916, 916' may be mounted on motorized objective changer 918 for being selectively interposed between sample 9102 and an image sensor, along an optical path along which illuminating radiations that originate from the light source and are incident on the sample 9102 and subsequently on an image sensor, are directed. In an embodiment, a first objective 916 has a lower magnification than a second objective 916'.

The digital microscope assembly 900 also includes a laser 926 which provides a source of light that is used for excitation of sample 9102 in cases where raman spectroscopy based scanning techniques are being implemented for biological samples. The laser 926 may be provided with an emission filter so that beams that are emitted from the laser 926 and introduced into the optical path 'O' by the motorized stage 920 are specific to the emission spectra wavelengths required for raman spectroscopy.

A motorized field diaphragm 924 may be included within assembly 900, wherein said diaphragm 924 is configured to control the amount of light (originally emitted by laser source 926) that is projected onto the sample 9102—for the purposes of controlling photo bleaching of sample 9102.

The digital microscope assembly may include a motorized stage 920 one or more than one dichroic mirrors and/or filters that are selectively interposable between an imaging apparatus 936 and a sample 9102 along an optical path 'O' between the two. The motorized stage 920 may be used to selectively interpose the dichroic elements at an optical path for the purpose of implementing raman excitation of sample 9102. The motorized stage 920 may be used in synchronization with the laser source 926. As shown, the dichroic mirrors may be selectively positioned such that illuminating radiation from laser 926 are directed onto sample 9102, and the inelastic scattered light is scattered off sample 9102 are collected through a selectively positioned objective 916, 916' and directed onto an image sensor 936 for forming an image of sample 9102.

Motorized filter wheel(s) 928 comprises one or more motorized stages that can be used to selectively interpose filters along an optical path, and between sample 9102 and an image sensor of an imaging apparatus 936. In an embodiment, the motorized filter wheel(s) 928 enable control over the detection of samples under specific filters for raman techniques.

In an embodiment of assembly 900, a tube lens assembly 932 may be positioned along an optical path and between motorized filter wheel(s) 928 and beam splitter 930. The tube lens assembly 932 is configured for focusing images on the plane of an image sensor—and may be motorized so that it can move along the optical axis 'O' (in the direction of the z-axis) to ensure proper focus of light transmitted from sample 9102 onto an image sensor within an imaging apparatus 536, 636.

A motorized beam splitter 930 may be provided within assembly 900 positioned at an optical path along which illuminating radiations that originate from laser 926 and are incident on sample 9102, 6102 are directed, onto a first imaging apparatus 936. The beam splitter 930 may include one or more mirrors, one or more diffraction gratings DG, and one or more transmission gratings TG, is configured for directing inelastic scatted light that has been collected by objective 916, 916' onto an image sensor within a monochrome imaging apparatus 936 for spectral imaging and analysis.

The digital microscope assembly 900 includes a first camera or first imaging apparatus 936, configured for generating images of sample 9102, for the purposes of raman spectroscopy based image analysis and sample state determination of sample 9102. In an embodiment, the first imaging apparatus 936 comprises a monochrome image sensor (e.g. a monochrome CMOS/CCD image sensor). The monochrome image sensor may be used for obtaining high quality images. The images thus generated are then input to an AI engine/neural network trained for analysis of raman spectroscopy emission data, for differentiating cells or sample features to identify state information corresponding to the sample 9102. The features of the present invention that implement raman spectroscopy has been found to be helpful not only for biological analysis, but also for meteorology, material science inspection, chemical analysis, surface analysis research etc.

FIG. 10 illustrates a fifth embodiment of a digital microscope assembly of a kind that has been more generally described in connection with FIG. 1 and that is used for state information determination based on polarized light.

Digital microscope assembly 1000 comprises a light source 1002 that is configured to emit illuminating radiation that can be directed onto a sample 10102 that is placed on a sample slide 10104 for magnification and imaging using microscope assembly 1000. Light source 1002 may comprise one or both of a multi spectrum laser based illuminator and one or more LED illuminator. The primary function of light source 1002 is to emit light that can be directed onto sample 10102 for polarized light based microscopy techniques—for example, for use with histology or hematology related sample slides or for use with microfluidic cartridges under different staining conditions. The light source can additionally comprise one or more mirrors, filters and lens assemblies—which may by selected according to the sample staining methods or conditions that have been used.

Digital microscope assembly 1000 additionally comprises a lens assembly 1004 (which may comprise a single lens or a plurality of lenses or optical elements combined together) that is configured to produce collimated beams of different wavelengths of light originating from light source 1002.

Digital microscope assembly 1000 further comprises mirror 1006 to direct or propagate light along a desired optical path or axis such that light emitted from light source 1002 is directed onto sample 10102 and through an objective 1016, 4106' onto an imaging sensor within an imaging apparatus 1034, 1036.

A motorized polariser 1008 is positioned along an optical path between light source 1002 and sample 10102—and comprises one or more motorized stages configured to selectively introduce linear and/or circular polarizers into the optical path—so as to polarize light emitted from light source 1002. In the event that the motorized polarized 1008 is used to selectively introduce a linear polarizer, the linear polarizer can be rotated about its axis to control the angle of polarization. The polarizer may be used for any of brightfield microscopy, phase relief contrast imaging, circular and/or linear polarized imaging techniques (which are essential for digital pathology).

A motorized field diaphragm 1014 positioned along the optical path and between light source 1002 and sample 10102, is used to control the amount of light entering into the microscope and thus helps in imaging the slides in a more controlled manner.

A motorized condenser 1012 may be positioned along the optical path and between light source 1002 and sample 10102, and is configured to precisely controls the light cone which is passed through the sample plane for the objective 1016, 1016' to capture maximum light from the space while minimising photo bleaching.

Motorized stage(s) 1010 comprises a motorized linear stage or circular stage that is configured for moving a slide (e.g. the sample slide) 10104 in a plane (X, Y plane). In an embodiment motorized stage 1010 may comprise two linear stages with feedback capabilities for positional accuracy.

The digital microscope assembly 1000 includes a motorized objective changer 1018 having a plurality of objectives 1016, 1016' disposed thereon—comprising a switching assembly configured to selectively interpose one of the plurality of objectives 1016, 1016' between sample 10102 and an image sensor, along an optical path along which illuminating radiations that originate from light source 1002 and are incident on sample 10102 and subsequently on the image sensor, are directed. The motorized objective changer 1018 enables selection of one of the plurality of objectives 1016, 1016' for magnifying sample 10102 for the purposes of viewing/imaging—and can be implemented by any switching or moving assembly, including any one or more linear switching assemblies, or one or more circular/rotary switching assemblies.

A plurality of objectives 1016, 1016' is provided within assembly 1000—wherein each of the plurality of objectives comprises an optical assembly that includes one or more lens elements, filter elements or other optical elements, and each of objectives 1016, 1016' has optical properties that are distinct or different from the remaining objectives in the plurality of objectives 1016, 1016'. Each objective 1016, 1016' may be mounted on motorized objective changer 1018 for being selectively interposed between sample 10102 and an image sensor, along an optical path along which illuminating radiations that originate from light source 1002 and are incident on sample 10102 and subsequently on the image sensor, are directed. In an embodiment, a first objective 1016 has a lower magnification than a second objective 1016'.

The digital microscope assembly 1000 may also include a laser/LED source (not shown) which provides a source of light that may optionally be used for excitation of sample 10102 in cases where fluorescence scanning techniques are being implemented for biological samples.

A motorized field diaphragm (not shown) may be included within assembly 1000—wherein said diaphragm 1024 is configured to control the amount of light (emitted by the laser/LED source that is not shown) that is projected onto the sample 10102—for the purposes of controlling photo bleaching of sample 10102.

The assembly 1000 may additionally include a lens assembly (not shown) positioned and configured to project a collimated light beam that originates from the laser/LED source (that is not shown) onto a motorized stage 1020 comprising a dichroic mirror assembly.

The digital microscope assembly may include a motorized stage 1020 comprising one or more than one dichroic mirrors and/or filters that are selectively interposable between an imaging apparatus 1034, 1036 and a sample 10102 along an optical path between the two. The motorized stage 1020 may be used to selectively interpose the dichroic elements at an optical path for the purpose of implementing fluorescence techniques and/or raman excitation of samples.

Motorized filter wheel(s) 1028 comprises one or more motorized stages that can be used to selectively interpose filters along an optical path, and between sample 10102 and an image sensor of an imaging apparatus 1036, 1034. In an embodiment, the motorized filter wheel(s) 1028 enable control over the detection of samples under specific filters for both fluorescence and raman techniques.

In an embodiment of assembly 1000, a tube lens assembly 1032 may be positioned along an optical path and between motorized filter wheel(s) 1028 and beam splitter 1030. The tube lens assembly 1032 is configured for focusing images on the plane of an image sensor—and may be motorized so that it can move along the optical axis (in the direction of the z-axis) to ensure proper focus of light transmitted from sample 10102 onto an image sensor.

A motorized beam splitter 430 may be provided within assembly 1000, positioned at an optical path along which illuminating radiations that originate from light source 1002 and are incident on sample 10102 are directed, and configured to split illuminating radiation travelling from sample 10102 between a first imaging apparatus 1036 and a second imaging apparatus 1034. The motorized beam splitter 1030 may include one or more mirrors, or lens elements, one or more diffraction gratings DG, and/or one or more transmission gratings TG, and is configured for selectively directing light transmitted from sample 10102 onto different imaging sensors for selectively implementing fluorescence, brightfield, and raman spectroscopy based imaging and analysis techniques.

The digital microscope assembly 1000 may include a first camera or first imaging apparatus 1036 configured for generating images of sample 10102 for the purposes of image analysis and sample state determination of sample 10102. In an embodiment, the first imaging apparatus 1036 may comprise a monochrome image sensor (e.g. a monochrome CMOS/CCD image sensor). The monochrome image sensor may be used for obtaining high quality images.

The digital microscope assembly 1000 may also include a second camera or second imaging apparatus 1034 configured for generating images of sample 10102 for the purposes of image analysis and sample state determination of sample 10102. In an embodiment, the second imaging apparatus 1036 may comprise a color image sensor (e.g. a color CMOS/CCD image sensor). The color image sensor may be used for capturing high resolution color images.

It will be understood that any of the various embodiment of the digital microscope assembly illustrated in and described in connection with FIG. 1 and FIGS. 4 to 10 hereinabove, may be used for the purposes of implementing the methods that have been described in connection with FIGS. 2 and 3 above.

The teachings of the above invention result in a microscope that combines spectroscopy—e.g. Raman spectroscopy—with brightfield (visible wavelength based) digital microscopy, and which additionally have other capabilities including fluorescence based on polarized light imaging based imaging and analysis capabilities.

Raman spectroscopy has been widely used to analyse precisely the chemical composition of biological samples. Selective fusion of brightfield or fluorescence based microscopy with Raman spectroscopy will significantly improve the specificity and sensitivity for in-vitro diagnostics. Raman spectroscopy has several features that are advantageous for medical diagnostics. It has high chemical specificity and molecular information can be obtained without requiring staining or labelling. Changes in the molecular composition of biological samples as measured by Raman spectroscopy can be used to build multivariate calibration and classification models, which allow quantitative and objective diagnosis for independent patients. Raman spectroscopy relies on scattering of light by molecules and information regarding the vibrational modes of the molecules can be obtained using visible or near-infrared lasers.

According to the present invention, bright field microscopy will be used to scan and select a site at which the Raman scattering has to be done to find a specific disease state more accurately and quickly. An artificial intelligence/machine learning algorithm is used to scan the brightfield microscopy images and to identify regions of interest/target parameters in the image(s) of the specimen sample. These regions of interest/target parameters will thereafter be subjected to scanning using Raman spectroscopy based scattering for the chemical compositions—and the scanned chemical compositions can be compared against the precalibrated data for an accurate diagnosis or prognosis of the specimen sample or of a disease state.

FIG. 11 illustrates a system 1100 configured to implement the methods of FIGS. 1 and 2. System 1100 includes a microscope assembly 1112 that includes at least an image sensor 1116 and a spectroscopy assembly 1114. Image data from the image sensor 1116 is transmitted to an image scanner 1106—wherein the image scanner 1106 is configured to parse image data from brightfield microscopy images received from the image sensor(s) and to transmit the parsed image data a processor implemented AI based region of interest (ROI) detector 1104. The AI Based Region of Interest (ROI) Detector 1104 comprises a processor implemented detector that is configured to implement one or more artificial intelligence processes or machine learning processes or neural networks configured to analyse the data parsed from the brightfield microscopy images received from the image sensor(s) 1116 and to identify regions of interest in the image(s) of the specimen sample.

These regions of interest are thereafter transmitted to a processor implemented spectroscopy control unit 1108 that is configured to control a spectroscopy assembly 1114 such that the spectroscopy assembly 1114 scans the identified regions of interest within the specimen sample using Raman spectroscopy based scattering for scanning chemical compositions within the identified regions of interest—such that the scanned chemical compositions can be compared against the precalibrated data for an accurate diagnosis or prognosis of the specimen sample or of a disease state.

It will be noted that the system also includes (i) an image display interface 1118 to enable a user/operator to view brightfield images acquired by the image sensor(s), and (ii) a spectroscopy interface 1110 to enable a user operator to view information/images generated by the spectroscopy assembly 1115.

In various embodiments of the invention described above, the sample slide on which a sample is disposed for analysis comprises a microfluidic substrate. The preparation of slides has always been a tedious and a potential source for error in diagnosis. The use of microfluidic based slides to process biological samples has been found to be accurate, faster and free of contamination for the purpose of digital microscopy in accordance with the teachings of the present invention.

In an embodiment, the invention provides, a microscope assembly comprising any one or more of (i) a first light source configured to emit illuminating radiations onto a sample slide, (ii) a focusing lens assembly positioned between the first light source and the sample slide that is configured to focus illumination radiations emitted by the first light source onto a sample positioned on the sample slide, (iii) a motorized stage configured to move the sample slide along one or both of an x-axis and a y-axis within a plane, (iv) a plurality of objectives mounted on a motorized objective changer, wherein (a) each objective within the plurality of objectives comprises an optical assembly, and each of the plurality of objectives has optical properties that are different from other objectives within the plurality of objectives, and (b) the motorized objective changer comprises a switching assembly configured to selectively interpose one of the plurality of objectives between the sample slide and an image sensor at an optical path along which illuminating radiations that have been reflected or scattered off the sample are directed, (iv) a first imaging apparatus having a first optical configuration, (v) a second imaging apparatus having a second optical configuration, (vi) a beam splitter positioned at an optical path along which illuminating radiations that have been reflected or scattered off the sample, are directed, wherein the beam splitter is configured to selectively direct illuminating radiations that have been scattered or reflected off the sample to the first imaging apparatus or the second imaging apparatus, and (vii) a processor configured for enabling image data from one or both of the first imaging apparatus and the second imaging apparatus to be transmitted to one or more processor implemented neural networks for analysis of image data.

In an embodiment of the microscope assembly, each of the objectives is provided with a corresponding focusing stage configured to alter the position of said objective along a z-axis.

The microscope assembly may also comprise a diffraction grating that is selectively interposable between one of the first imaging apparatus and the second imaging apparatus, and the sample slide, at an optical path along which illuminating radiation that is reflected or scattered off the sample are directed.

In a further embodiment, the microscope assembly may comprise a motorized polariser, a first motorized field diaphragm and a motorized condenser, each positioned at an optical path between the first light source and the sample.

The microscope assembly may also comprise a filter assembly comprising one or more optical filters, wherein the filter assembly is selectively interposable between one of the first imaging apparatus and the second imaging apparatus, and the sample slide, at an optical path along which illuminating radiation that is reflected or scattered off the sample are directed.

In an embodiment, the microscope assembly comprises (i) a second light source comprising one of a laser and LED light source, configured to emit light for excitation of the sample, (ii) a dichroic mirror assembly configured and positioned to direct light emitted from the second light source onto the sample, and (iii) a field diaphragm interposed between the second light source and the sample for controlling an amount of light projected from the second light source onto the sample.

In another embodiment of the microscope assembly, the first light source and the second light source are positioned on alternate sides of the sample.

In one embodiment of the microscope assembly, (i) the first imaging apparatus comprises a monochrome image sensor, and (ii) the second imaging apparatus comprises a color image sensor.

The invention additionally provides a method of slide sample analysis. In various embodiments, the method may be implemented using any one or more of the microscope assembly embodiments described hereinabove. The method comprises (i) positioning a sample slide on a motorized stage, (ii) acquiring at a first image sensor, a plurality of images of the slide, each image including an image corresponding to a different portion of a sample disposed on the sample slide, (iii) storing each of the plurality of images in a memory, wherein each image is stored along with position coordinates defining a position of the portion of the sample that has been imaged therewithin, (iv) identifying within the combined image, one or more regions of interest of the sample, (v) obtaining raman spectroscopy based image data corresponding to the identified one or more regions of interest of the sample, (vi) storing obtained raman spectroscopy data corresponding to each region of interest in a memory, wherein each instance of raman spectroscopy data is stored along with position coordinates defining a position of the region of interest within the sample to which the raman spectroscopy data corresponds, and (vii) determining based on the raman spectroscopy data whether the sample includes one or more states of interest.

In an embodiment of the above method, (i) the step of identification of one or more regions of interest within the combined image comprises providing the combined image as an input to a first processor implemented neural network and receiving as an output from the first processor implemented neural network, data identifying within the combined image one or more regions of interest of a type that the first processor implemented neural network has been trained to identify, and (ii) the step of determining based on the raman spectroscopy data whether the sample includes one or more states of interest, includes providing the raman spectroscopy data as an input to a second processor implemented neutral network and receiving as an output from the second processor implemented neural network, data identifying whether the sample includes one or more states of interest of a type that the second processor implemented neural network has been trained to identify.

FIG. 12 illustrates an exemplary computer system 1200 according to which various embodiments of the present invention may be implemented.

System 1200 includes computer system 1202 which in turn comprises one or more processors 1204 and at least one memory 1206. Processor 1204 is configured to execute program instructions—and may be a real processor or a virtual processor. It will be understood that computer system 1202 does not suggest any limitation as to scope of use or functionality of described embodiments. The computer system 1202 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1202 in accordance with the present invention may include one or more servers, desktops, laptops, tablets, smart phones, mobile phones, mobile communication devices, phablets and personal digital assistants. In an embodiment of the present invention, the memory 1206 may store software for implementing various embodiments of the present invention. The computer system 1202 may have additional components. For example, the computer system 1202 may include one or more communication channels 1208, one or more input devices 1210, one or more output devices 1212, and storage 1214. An interconnection mechanism (not shown) such as a bus, controller, or network, interconnects the components of the computer system 1202. In various embodiments of the present invention, operating system software (not shown) provides an operating environment for various softwares executing in the computer system 1202 using a processor 1204, and manages different functionalities of the components of the computer system 1202.

The communication channel(s) 1208 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1210 may include, but is not limited to, a touch screen, a keyboard, mouse, pen, joystick, trackball, a voice device, a scanning device, or any another device that is capable of providing input to the computer system 1202. In an embodiment of the present invention, the input device(s) 1210 may be a sound card or similar device that accepts audio input in analog or digital form. The output device(s) 1212 may include, but not be limited to, a user interface on CRT, LCD, LED display, or any other display associated with any of servers, desktops, laptops, tablets, smart phones, mobile phones, mobile communication devices, phablets and personal digital assistants, printer, speaker, CD/DVD writer, or any other device that provides output from the computer system 1202.

The storage 1214 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1202. In various embodiments of the present invention, the storage 1214 may contain program instructions for implementing any of the described embodiments.

In an embodiment of the present invention, the computer system 1202 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1202. The method described herein is typically implemented as a computer program product, comprising a set of program instructions that is executed by the computer system 1202 or any other similar device. The set of program instructions may be a series of computer readable codes stored on a tangible medium, such as a computer readable storage medium (storage 1214), for example, diskette, CD-ROM, ROM, flash drives or hard disk, or transmittable to the computer system 1202, via a modem or other interface device, over either a tangible medium, including but not limited to optical or analogue communications channel(s) 1208. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

We claim:

1. A microscope assembly comprising:
a first light source configured to emit illuminating radiations onto a sample slide;
a focusing lens assembly positioned between the first light source and the sample slide that is configured to focus illumination radiations emitted by the first light source onto a sample positioned on the sample slide;
a motorized stage configured to move the sample slide along one or both of an x axis and a y-axis within a plane;

a plurality of objectives mounted on a motorized objective changer, wherein:

each objective within the plurality of objectives comprises an optical assembly, and each of the plurality of objectives has optical properties that are different from other objectives within the plurality of objectives; and the motorized objective changer comprises a switching assembly configured to selectively interpose one of the plurality of objectives between the sample slide and an image sensor at an optical path along which illuminating radiations that have been reflected or scattered off the sample are directed;

a first imaging apparatus having a first optical configuration;

a second imaging apparatus having a second optical configuration;

a beam splitter positioned at the optical path along which illuminating radiations that have been reflected or scattered off the sample, are directed, wherein the beam splitter is configured to selectively direct illuminating radiations that have been scattered or reflected off the sample to the first imaging apparatus or the second imaging apparatus;

a motorized polariser, a first motorized field diaphragm, and a motorized condenser, each positioned at the optical path between the first light source and the sample; and a processor configured for enabling raman spectroscopy image data from one or both of the first imaging apparatus and the second imaging apparatus to be transmitted to one or more processor implemented neural networks for analysis of raman spectroscopy image data.

2. The microscope assembly as claimed in claim 1, wherein each of the objectives is provided with a corresponding focusing stage configured to alter the position of said objective along a z-axis.

3. The microscope assembly as claimed in claim 1, comprising a diffraction grating that is selectively interposable between one of the first imaging apparatus and the second imaging apparatus, and the sample slide, at the optical path along which illuminating radiation that is reflected or scattered off the sample are directed.

4. The microscope assembly as claimed in claim 1, comprising a filter assembly comprising one or more optical filters, wherein the filter assembly is selectively interposable between one of the first imaging apparatus and the second imaging apparatus, and the sample slide, at the optical path along which illuminating radiation that is reflected or scattered off the sample are directed.

5. A microscope assembly comprising:

a first light source configured to emit illuminating radiations onto a sample slide;

a focusing lens assembly positioned between the first light source and the sample slide that is configured to focus illumination radiations emitted by the first light source onto a sample positioned on the sample slide;

a motorized stage configured to move the sample slide along one or both of an x axis and a y-axis within a plane;

a plurality of objectives mounted on a motorized objective changer, wherein:

each objective within the plurality of objectives comprises an optical assembly, and each of the plurality of objectives has optical properties that are different from other objectives within the plurality of objectives; and the motorized objective changer comprises a switching assembly configured to selectively interpose one of the plurality of objectives between the sample slide and an image sensor at an optical path along which illuminating radiations that have been reflected or scattered off the sample are directed;

a first imaging apparatus having a first optical configuration;

a second imaging apparatus having a second optical configuration;

a beam splitter positioned at the optical path along which illuminating radiations that have been reflected or scattered off the sample, are directed, wherein the beam splitter is configured to selectively direct illuminating radiations that have been scattered or reflected off the sample to the first imaging apparatus or the second imaging apparatus;

a processor configured for enabling raman spectroscopy image data from one or both of the first imaging apparatus and the second imaging apparatus to be transmitted to one or more processor implemented neural networks for analysis of raman spectroscopy image data;

a second light source comprising one of a laser and LED light source, configured to emit light for excitation of the sample;

a dichroic mirror assembly configured and positioned to direct light emitted from the second light source onto the sample; and a field diaphragm interposed between the second light source and the sample for controlling an amount of light projected from the second light source onto the sample.

6. The microscope assembly as claimed in claim 5, wherein the first light source and the second light source are positioned on alternate sides of the sample.

7. The microscope assembly as claimed in claim 1, wherein:

the first imaging apparatus comprises a monochrome image sensor; and the second imaging apparatus comprises a color image sensor.

8. A method of slide sample analysis, comprising:

positioning a sample slide on a motorized stage;

acquiring at a first image sensor, a plurality of images of the slide, each image including an image corresponding to a different portion of a sample disposed on the sample slide;

storing each of the plurality of images in a memory, wherein each image is stored along with position coordinates defining a position of the portion of the sample that has been imaged therewithin;

identifying within the combined image, one or more regions of interest of the sample;

obtaining raman spectroscopy based image data corresponding to the identified one or more regions of interest of the sample;

storing obtained raman spectroscopy data corresponding to each region of interest in the memory, wherein each instance of raman spectroscopy data is stored along with position coordinates defining a position of the region of interest within the sample to which the raman spectroscopy data corresponds; and determining based on the raman spectroscopy data whether the sample includes one or more states of interest.

9. The method as claimed in claim 8, wherein:

the step of identification of one or more regions of interest within the combined image comprises providing the combined image as an input to a first processor implemented neural network and receiving as an output from the first processor implemented neural network, data identifying within the combined image one or more regions of interest of a type that the first processor implemented neural network has been trained to identify; and the step of determining based on the raman spectroscopy data whether the sample includes one or more states of interest, includes providing the raman spectroscopy data as an input to a second processor implemented neutral network and receiving as an output from the second processor implemented neural network, data identifying whether the sample includes one or more states of interest of a type that the second processor implemented neural network has been trained to identify.

* * * * *